(12) United States Patent
Takatsuka et al.

(10) Patent No.: US 12,549,334 B2
(45) Date of Patent: Feb. 10, 2026

(54) SENSOR DEVICE AND ENCRYPTION METHOD

(71) Applicant: Sony Group Corporation, Tokyo (JP)

(72) Inventors: Susumu Takatsuka, Tokyo (JP); Kenta Kawamoto, Tokyo (JP); Hiroki Tetsukawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 239 days.

(21) Appl. No.: 17/422,394

(22) PCT Filed: Jan. 22, 2020

(86) PCT No.: PCT/JP2020/002122
§ 371 (c)(1),
(2) Date: Jul. 12, 2021

(87) PCT Pub. No.: WO2020/158541
PCT Pub. Date: Aug. 6, 2020

(65) Prior Publication Data
US 2022/0109556 A1 Apr. 7, 2022

(30) Foreign Application Priority Data

Jan. 30, 2019 (JP) .................................. 2019-013969

(51) Int. Cl.
*H04L 9/06* (2006.01)
*G06T 7/20* (2017.01)
(Continued)

(52) U.S. Cl.
CPC ................ *H04L 9/065* (2013.01); *G06T 7/20* (2013.01); *G06V 20/52* (2022.01); *H04L 9/0869* (2013.01);
(Continued)

(58) Field of Classification Search
CPC ......... H04L 9/065; H04L 9/0869; H04L 9/14; G06V 20/52; H04N 23/61; H04N 23/80;
(Continued)

(56) References Cited

U.S. PATENT DOCUMENTS 5,598,472 A 1/1997 Schuchman et al.
6,598,161 B1 * 7/2003 Kluttz ................. G06F 21/6209
713/168

(Continued)

FOREIGN PATENT DOCUMENTS

CN 101014097 A 8/2007
CN 101035273 A 9/2007
(Continued)

OTHER PUBLICATIONS

Extended European Search Report dated Jan. 25, 2022 for corresponding European Application No. 20748566.5.
(Continued)

*Primary Examiner* — Jeremy S Duffield
(74) *Attorney, Agent, or Firm* — Michael Best & Friedrich LLP

(57) ABSTRACT

Image encryption in which excessive concealment of information is prevented while reduction in cost is achieved by eliminating a need for a receiving side of an image to take measures against leakage of personal information is realized. In one example, a sensor device includes an array sensor with pixels having a light receiving element of visible or invisible light. A detector detects a target area on the basis of an image signal obtained by the array sensor. The target area in the image signal is encrypted on the basis of information from the detector. Thus, encryption of the image signal can be performed in the image sensor at least to the extent that no individual can be identified. Also, depending on a decryption key on a receiving side of the image, a part (Continued)

of the content of the image can be visually recognized while personal information is concealed.

16 Claims, 20 Drawing Sheets

(51) Int. Cl.
*G06V 20/52* (2022.01)
*H04L 9/08* (2006.01)
*H04L 9/14* (2006.01)
*H04N 23/61* (2023.01)
*H04N 23/80* (2023.01)

(52) U.S. Cl.
CPC .............. *H04L 9/14* (2013.01); *H04N 23/61* (2023.01); *H04N 23/80* (2023.01); *G06T 2207/30196* (2013.01); *G06T 2207/30232* (2013.01)

(58) Field of Classification Search
CPC ............. G06T 7/20; G06T 2207/30196; G06T 2207/30232
See application file for complete search history.

(56) References Cited

U.S. PATENT DOCUMENTS

| | | | |
|---|---|---|---|
| 7,240,208 | B1 | 7/2007 | Oakley |
| 7,266,245 | B1 | 9/2007 | Lin |
| 9,635,317 | B1* | 4/2017 | Ludwig .............. H04N 21/4223 |
| 2005/0052555 | A1* | 3/2005 | Shirakawa ............. H04N 5/185 375/E7.184 |
| 2007/0116292 | A1* | 5/2007 | Kurita ..................... G06F 21/34 380/273 |
| 2007/0201694 | A1* | 8/2007 | Bolle .................. G06T 1/0021 380/205 |
| 2008/0130883 | A1* | 6/2008 | Agaian .................... G09C 5/00 380/54 |
| 2008/0267403 | A1* | 10/2008 | Boult .................... H04L 9/0894 380/255 |
| 2008/0279380 | A1* | 11/2008 | Hayashi .................. H04L 9/088 380/243 |
| 2009/0119517 | A1 | 5/2009 | Ziv |
| 2011/0222687 | A1 | 9/2011 | Mori |
| 2012/0138774 | A1 | 6/2012 | Kelly et al. |
| 2013/0283061 | A1* | 10/2013 | Jeong ................. G06F 21/6227 713/189 |
| 2014/0368680 | A1* | 12/2014 | Ayers ................ H01L 27/14609 348/216.1 |
| 2015/0169892 | A1* | 6/2015 | Nord ..................... H04L 9/0861 726/9 |
| 2015/0371063 | A1* | 12/2015 | Van Antwerpen ....... G09C 1/00 713/190 |
| 2016/0071101 | A1* | 3/2016 | Winarski ............... G06V 40/40 705/71 |
| 2016/0189325 | A1* | 6/2016 | Zhou ..................... H04L 9/0637 380/28 |
| 2016/0285626 | A1 | 9/2016 | Myers |
| 2017/0094210 | A1 | 3/2017 | Galor Gluskin |
| 2017/0289390 | A1 | 10/2017 | Takasu |
| 2019/0377553 | A1* | 12/2019 | Maynard ................... G06F 7/58 |
| 2020/0068166 | A1* | 2/2020 | Davidson ............... G06F 21/78 |

FOREIGN PATENT DOCUMENTS

| | | | | |
|---|---|---|---|---|
| CN | 101652987 | A | | 2/2010 |
| CN | 108650434 | A * | 10/2018 | .......... G06K 9/3233 |
| JP | 09-093560 | A | | 1/1997 |
| JP | 2001-086407 | A | | 3/2001 |
| JP | 2008-527622 | A | | 9/2008 |
| JP | 2009-206920 | A | | 9/2009 |
| JP | 4402998 | B2 | | 1/2010 |
| JP | 2013-012930 | A | | 1/2013 |
| JP | 2017-184147 | A | | 10/2017 |
| KR | 10-2007-0018360 | A | | 2/2007 |
| KR | 20130126800 | A | | 11/2013 |
| TW | 201303814 | A1 | | 1/2013 |
| WO | WO-9824186 | A2 | | 6/1998 |
| WO | WO-2008146390 | A1 | | 12/2008 |
| WO | WO-2016167076 | A1 | | 10/2016 |

OTHER PUBLICATIONS

Peng Zhang et al., "Privacy enabled video surveillance using a two state Markov tracking algorithm", Multimedia Systems, Springer, Berlin, DE, vol. 18, No. 2, Aug. 20, 2011 (Aug. 20, 2011), pp. 175-199, XP035018859, ISSN: 1432-1882, DOI:10.1007/S00530-011-0247-8. * sections 2 to 4.
International Search Report (PCT/ISA/210), International Application No. PCT/JP2020/002122, dated Mar. 27, 2020.
Notification of Transmittal of the International Search Report and the Written Opinion of the International Searching Authority, or the Declaration (PCT/ISA/220), International Application No. PCT/JP2020/002122, dated Apr. 7, 2020.
Written Opinion of the International Search Authority (PCT/ISA/237), International Application No. PCT/JP2020/002122, dated Apr. 7, 2020.
"Modern Cryptography" Zhang Jianhong Apr. 30, 2011 pp. 146-148.

\* cited by examiner

Fig. 11

Fig. 20

SENSOR DEVICE AND ENCRYPTION METHOD

TECHNICAL FIELD

The present technique relates to a sensor device and an encryption method, and particularly to the technical field related to encryption of an image signal obtained by an array sensor.

BACKGROUND ART

For example, on the basis of an image signal obtained by imaging with a surveillance camera, analysis of attributes and behaviors of a subject (for example, a person) projected in an image may be performed using an image analyzing device (for example, a cloud server or the like) present outside the camera. For example, it is conceivable that, by analyzing an image captured by a surveillance camera disposed in a store, attribute information such as a customer's gender and age can be obtained, and the customer's behavior (line of flow) in the store can be identified and utilized for marketing.

Also, as a related prior art, PTL 1 below discloses encryption of a captured image.

CITATION LIST

Patent Literature

[PTL 1]
JP 2009-027333 A

SUMMARY

Technical Problem

Here, in a case in which a person himself or herself, or information from which the person can be identified is projected on an image captured by a camera, it is required for the side that manages the image captured by the camera (that is, the side that receives a camera image) to ensure a high level of security to prevent leakage of personal information, in a situation in which personal information protection is strongly required as in recent years, which leads to an increase in cost.

The present technique has been made in view of the above circumstances, and an object thereof is to realize image encryption in which excessive concealment of information is prevented while reduction in cost is achieved by eliminating a need for a receiving side of an image to take measures against leakage of personal information.

Solution to Problem

A sensor device according to the present technique includes: an array sensor in which a plurality of pixels each having a light receiving element of visible or invisible light are arranged one-dimensionally or two-dimensionally; a detection unit that detects an area of a target projected in an image as a target area on the basis of an image signal obtained by imaging with the array sensor; and an encryption unit that performs encryption targeting the target area in the image signal on the basis of information of the target area detected by the detection unit.

Thus, encryption of the image signal obtained by imaging with the array sensor can be performed in the image sensor at least to the extent that no individual can be identified.

In addition, depending on the state of holding of a decryption key on a receiving side of the image, a part of the content of the image can be visually recognized while personal information is concealed.

In the sensor device according to the present technique mentioned above, it is conceivable that, in the encryption of the image signal, the encryption unit encrypts the entire image on the basis of a first encryption key and encrypts the target area on the basis of the first encryption key and a second encryption key different from the first encryption key.

Thus, a part of the image that can be decrypted is distinguished by a decryption key held by the receiving side of the image. Specifically, in a case in which only a decryption key corresponding to the first encryption key is held, only an area other than the target area in the image can be decrypted, and in a case in which decryption keys corresponding to the first encryption key and the second encryption key are held, the entire image including the target area can be decrypted.

In the sensor device according to the present technique mentioned above, it is conceivable that the detection unit performs processing of recognizing a specific part of the target, and the encryption unit performs the encryption on the basis of different encryption keys for an area of the specific part and other areas in the target area.

Thus, it is possible to change a concealment level of a target depending on the decryption keys held by the receiving side of the image. For example, in a case in which the target is a person, it is possible to classify the concealment level such as concealment of a whole body and concealment of only a face.

In the sensor device according to the present technique mentioned above, it is conceivable that an analysis unit that analyzes attributes or actions of the target, and an output unit that outputs information representing analysis results performed by the analysis unit are included.

Thus, even in a case in which the receiving side of the image does not have the decryption keys, it is possible to provide the analysis results of the attributes and actions of the target.

In the sensor device according to the present technique mentioned above, it is conceivable that the detection unit performs detection of the target by decrypting the image signal encrypted on the basis of the first encryption key using an on-the-fly method.

Thus, it is possible to reduce the possibility that the image signal in a plaintext state is leaked.

In the sensor device according to the present technique mentioned above, it is conceivable that the encryption unit encrypts the image signal on the basis of a synthetic key obtained by synthesizing a plurality of encryption keys.

Thus, the number of executions of encryption processing necessary for realizing the encryption in which the concealment level of personal information is gradually changed can be reduced.

In the sensor device according to the present technique mentioned above, it is conceivable that the encryption unit performs encryption targeting the target area while tracking the target.

Thus, in a case in which the image to be encrypted is a moving image, it is possible to appropriately conceal a moving target.

In the sensor device according to the present technique mentioned above, it is conceivable that the encryption unit performs encryption of the image signal using a stream cipher method.

Thus, preprocessing for the encryption of the image signal is not required.

In the sensor device according to the present technique mentioned above, it is conceivable that the array sensor, the detection unit, and the encryption unit are configured in one package.

Thus, it is possible to improve tamper resistance in terms of hardware.

In the sensor device according to the present technique mentioned above, it is conceivable that the encryption unit generates an encryption key on the basis of a photoelectric random number which is a random number obtained on the basis of photoelectric conversion performed by the array sensor and performs encryption of the image signal on the basis of the generated encryption key.

Thus, it is possible to realize the encryption in which it is more difficult to decrypt the encryption key than in a case of using a pseudo-random number.

In the sensor device according to the present technique mentioned above, it is conceivable that the encryption unit performs encryption of reading signals from the pixels of the array sensor.

Thus, it is possible to prevent a plaintext image signal from being stored in a memory in the encryption.

An encryption method according to the present technique is an encryption method including: detecting an area of a target projected in an image as the target area on the basis of an image signal obtained by imaging with an array sensor in which a plurality of pixels each having a light receiving element of visible or invisible light are arranged one-dimensionally or two-dimensionally; and performing encryption targeting the target area in the image signal on the basis of information of the detected target area.

With such an encryption method, the same operation as that of the sensor device according to the present technique can also be obtained.

BRIEF DESCRIPTION OF DRAWINGS

FIG. 11 is a diagram showing an image of stepwise encryption in a case in which a class of a target is a person.

FIG. 20 is an explanatory diagram of an example of generating an encryption key to which a random value is assigned for each color unit.

DESCRIPTION OF EMBODIMENTS

Hereinafter embodiments will be described in the following order.
<1. First embodiment>
[1-1. Configuration of sensor device]
[1-2. Regarding random number used for encryption]
[1-3. Regarding signal serving as processing target]
[1-4. Regarding tamper resistance]
[1-5. Processing procedure]
[1-6. Output example of analysis information]
[1-7. Regarding key transfer]
<2. Second embodiment>
[2-1. Encryption method of second embodiment]
[2-2. Processing procedure]
[2-3. Output example of analysis information]
<3. Modified examples>
<4. Summary of embodiments>
<5. Present technique>

Further, in an embodiment described below, a sensor device 1 serving as an image sensor that has a light receiving element array and outputs an image signal as a detection signal will be exemplified. In particular, the sensor device 1 of the embodiment is a device that has an object detection function through image analysis and can be called an intelligent array sensor.

1. FIRST EMBODIMENT 1-1. Configuration of Sensor Device

Figure 1:
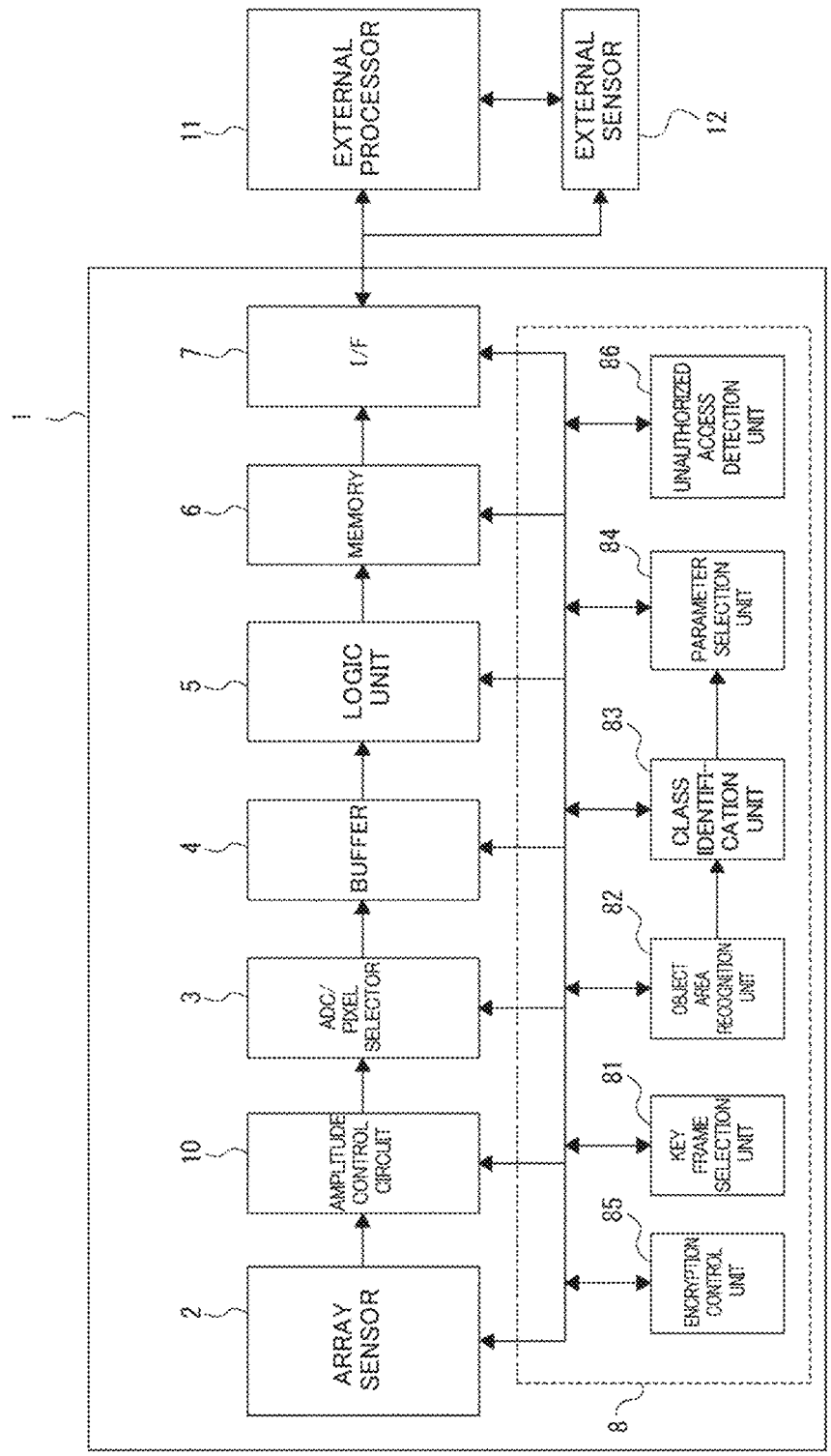
FIG. 1 is a block diagram of a sensor device of an embodiment according to the present technique.

FIG. 1 shows a configuration example of the sensor device 1. Further, FIG. 1 also shows an external processor 11 and an external sensor 12 as external devices that perform data communication with the sensor device 1. The external processor 11 is assumed to be a general-purpose processor that is connected to the sensor device 1 for communication.

As hardware, the sensor device 1 has configuration parts that serve as an image sensor device, a memory device such as a dynamic random access memory (DRAM), and an artificial intelligence (AI) function processor. In addition, these three parts are configured into an integrated device by being formed in a three-layer laminated structure, a so-called flat-laying structure with one layer, or a two-layer laminated structure (for example, the memory device and the AI function processor are on the same layer).

As shown in FIG. 1, the sensor device 1 has an array sensor 2, an amplitude control circuit 10, an analog to digital converter (ADC)/pixel selector 3, a buffer 4, a logic unit 5, a memory 6, an interface unit 7, and a calculation unit 8.

The array sensor 2 is configured such that a detection element is formed of a light receiving element of visible or invisible light, and a plurality of pixels each having the light receiving element are arranged one-dimensionally or two-dimensionally. For example, a large number of pixels are arranged two-dimensionally in a row direction and a column direction, and a two-dimensional image signal is output due to photoelectric conversion in the light receiving element of each pixel.

In addition, in the following description, the array sensor 2 serving as an image sensor outputs a two-dimensional image signal, but the array sensor 2 in the sensor device 1 may be configured by a sensor array module in which sound wave detection elements are arranged, a sensor array module in which tactile information detection elements are arranged, or the like.

The amplitude control circuit 10 performs amplitude control of an electrical signal (analog signal) photoelectrically converted by the array sensor 2. In the present example, the amplitude control circuit 10 is configured such that an amplification factor can be changed on the basis of an instruction from the calculation unit 8, and this point will be described later.

The electrical signal photoelectrically converted by the array sensor 2 is input to the ADC/pixel selector 3 via the amplitude control circuit 10. The ADC/pixel selector 3 converts the input electrical signal as an analog signal into digital data and outputs an image signal as digital data.

In addition, the ADC/pixel selector 3 has a pixel selection function for the pixels (an imaging element) of the array sensor 2. Thus, it is possible to acquire a photoelectric conversion signal and output it as digital data only for the selected pixels in the array sensor 2. That is, the ADC/pixel selector 3 normally outputs the photoelectric conversion signal as digital data for all the effective pixels constituting an image of one frame, but it is also possible to output the photoelectric conversion signal as digital data only for the selected pixels.

The ADC/pixel selector 3 acquires the image signal in units of frames, and the image signal of each frame is temporarily stored in the buffer 4, read out at an appropriate timing, and used for processing in the logic unit 5.

The logic unit 5 performs various necessary types of signal processing (image processing) on the input image signal of each frame.

For example, it is assumed that the logic unit 5 performs adjustment of image quality by processing such as color correction, gamma correction, color gradation processing, gain processing, contour enhancement processing, and the like.

Further, it is assumed that the logic unit 5 performs processing for changing a data size, such as data compression processing, resolution conversion, frame rate conversion, and the like.

Parameters used for each type of processing are set for each type of processing performed by the logic unit 5. For example, there are setting values such as color and brightness correction coefficients, gain values, compression rates, and frame rates. The logic unit 5 performs necessary processing using the parameters set for each type of processing. In the present embodiment, the calculation unit 8 may set these parameters.

The image signal processed by the logic unit 5 is stored in the memory 6 configured of, for example, a DRAM or the like.

Further, the memory 6 is assumed to be a DRAM, a static random access memory (SRAM), a magnetoresistive random access memory (MRAM), or the like. An MRAM is a memory that magnetically stores data and is known to use a tunneling magnetoresistive (TMR) element instead of a magnetic core. The TMR element has an extremely thin insulating layer configured of several atoms sandwiched between magnetic materials, and its electrical resistance changes depending on magnetization directions of layers of the magnetic materials. The magnetization direction of the TMR element does not change even when power is turned off, resulting in a non-volatile memory. Since a larger writing current is required as a size becomes finer, in order to make a memory cell finer, an STT-MRAM using a spin injection magnetization reversal method (spin torque transfer (STT)) in which electrons having uniform spins are flown for writing without using a magnetic field is known. Specific examples of the memory 6 may also include other storage elements.

The image signal stored in the memory 6 is transmitted and output to the external processor 11 or the like by the interface unit 7 at a required timing.

The external processor 11 performs image analysis and image recognition processing on the image signal transmitted from the sensor device 1 to execute necessary object detection and the like.

The external processor 11 can also refer to detection information of the external sensor 12.

Here, the external processor 11 is considered to be connected to the sensor device 1 in a wired or wireless manner.

Also, an imaging device including the sensor device 1 can have a network communication function and can also adopt a configuration in which the image signal (captured image signal) obtained by the sensor device 1 can be transmitted to a computer device (for example, a cloud server or the like) outside the imaging device via a network, for example, via a network such as the Internet or a local area network (LAN). For example, in such a case, the external processor 11 may be, for example, a processor in a cloud computing system.

The calculation unit 8 is configured of, for example, one AI processor. In addition, as executable calculation functions, as shown in the figure, it includes a key frame selection unit 81, an object area recognition unit 82, a class identification unit 83, a parameter selection unit 84, an encryption control unit 85, and an unauthorized access detection unit 86. Also, these calculation functions may be configured by a plurality of processors.

The key frame selection unit 81 performs processing of selecting a key frame from the frames of an image signal as a moving image according to a predetermined algorithm or instruction.

The object area recognition unit 82 performs detection of regions of objects serving as candidates for detection and recognition processing of a region (a bounding box) that surrounds a detection target object in an image (frame) for the detection target object with respect to a frame of the image signal photoelectrically converted by the array sensor 2 and acquired by the ADC/pixel selector 3.

The object detected from the image signal is an object that can be detection target for the purpose of recognition from the image. Although the kind of object to be detected differs depending on purposes of detection, processing capacity, application types, and the like of the sensor device 1 and the external processor 11, any object may be the detection target object here. Although only some are shown, for example, any type of object such as animals, moving objects (cars, bicycles, airplanes, and the like), natural objects (vegetables, plants, and the like), industrial products and components, buildings, facilities, mountains, seas, rivers, stars, the sun, clouds, and the like may be applicable.

Further, the object area recognition unit 82 in the present example executes processing of calculating a region of interest (ROI) which is area information indicating an area that should be a processing target (the region of interest) on the basis of the bounding box.

The class identification unit 83 performs classification of objects detected by the object area recognition unit 82.

The class is information that represents a category of objects and is a class obtained by classifying the objects to be detected, for example, "people", "cars", "airplanes", "ships", "trucks", "birds", "cats", "dogs", "deer", "frogs", "horses", etc.

The parameter selection unit 84 stores parameters for signal processing according to each class and selects one or a plurality of parameters corresponding thereto using the class of the detected object identified by the class identification unit 83, the bounding box, or the like. In addition, one or a plurality of parameters are set in the logic unit 5.

Here, processing of various functions performed by the calculation unit 8 described above is processing that would not normally be performed in an image sensor, and in the present embodiment, object detection, class recognition, and control based on these are executed in the image sensor. Thus, the image signal provided to the external processor 11 can be made as an appropriate signal for the purpose of detection, and an amount of data can be appropriately reduced not to cause deterioration of detection performance.

The encryption control unit 85 performs control such that the image signal obtained by imaging with the array sensor 2 is encrypted. Further, a specific example of the processing performed by the encryption control unit 85 for encrypting such an image signal will be described again.

The unauthorized access detection unit 86 detects unauthorized access from the outside of the sensor device 1. Specifically, the unauthorized access detection unit 86 in the present example detects unauthorized access to the data stored in the memory 6 from the outside.

In a case in which the unauthorized access detection unit 86 detects unauthorized access, log information thereof (for example, information indicating a detection date and time, a type of unauthorized access, and the like) is recorded in a predetermined area of the memory 6.

1-2. Regarding Random Number Used for Encryption

Although the sensor device 1 of the present embodiment encrypts the image signal here, conventionally, as a random number used for encryption, a pseudo-random number generated by software is often used. However, since the pseudo-random number is generated by an algorithm that calculates a numerical value and cannot generate a true random number, there was a risk that an encryption key may be decrypted and duplicated.

In consideration of this point, in the present example, a photoelectric random number is used to generate the encryption key.

The photoelectric random number is a random number obtained on the basis of the photoelectric conversion performed by the array sensor 2. Specifically, in the present embodiment, values of electric signals for each pixel obtained by the photoelectric conversion of the array sensor 2 are acquired as photoelectric random numbers to generate the encryption key.

Figure 2:
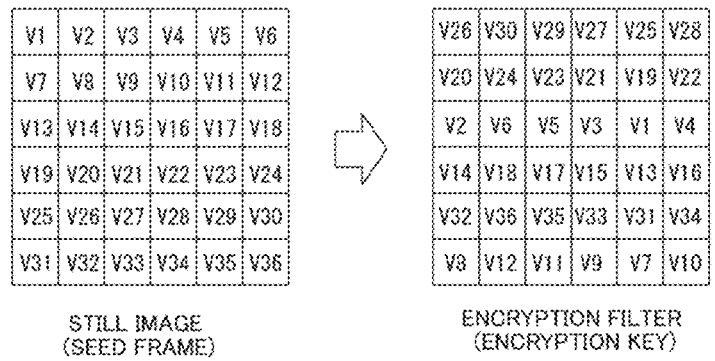
FIG. 2 is a diagram showing an example of a method of generating an encryption filter (encryption key) on the basis of a photoelectric random number.

FIG. 2 shows an example of a method of generating an encryption filter (encryption key) on the basis of the photoelectric random number.

First, values of electric signals for each pixel obtained by the photoelectric conversion of the array sensor 2 are illustrated on a left side of the figure.

Specifically, in the present example, each pixel value (a brightness value) of the image (still image) obtained by imaging with the array sensor 2 is used as the photoelectric random number.

Hereinafter, a frame image captured for obtaining the photoelectric random number, in other words, a frame image that is a source of the photoelectric random numbers, is referred to as a "seed frame".

In the present example, values themselves of electric signals for each pixel are not used as the encryption key, but as illustrated on a right side of the figure, an encryption key in a format in which at least some values of electric signals for each pixel are assigned to pixel positions different from pixel positions from which values of the electric signals are obtained is generated. In other words, the pixel positions are shuffled with respect to the values of the electric signals for each pixel obtained as photoelectric random numbers to generate the encryption key.

Thus, as compared with the case of using an encryption key in which values of electric signals for each pixel area directly assigned to pixel positions at which the values of the electric signals are obtained, it is difficult to decrypt the encryption key and security can be improved.

Here, in generating the encryption key, the values of the electric signal for each pixel can also be modulated using a predetermined algorithm and used. For example, values obtained by multiplying the values of the electric signals for each pixel by a predetermined coefficient may be used as random values of the pixels. Alternatively, in a case in which the values of the electric signals for each pixel include values after the decimal point, it is also possible to adopt a method in which a value obtained by converting a value of the last few decimal places into an integer is used as a random value at a pixel position.

In addition, in generating the encryption key, it is not essential to shuffle the pixel positions as described above, and the values themselves of the electric signals for each pixel can be used as the encryption key.

1-3. Regarding Signal Serving as Processing Target

Conventionally, in the case of encrypting an image signal obtained by imaging with the array sensor 2, it is usual for an image signal read from the array sensor 2 to be temporarily stored in a memory in a plaintext state, and encryption to be performed for the stored image signal.

However, in a case in which such an encryption method is adopted, it becomes possible to hack by intentionally causing an error at the timing of encryption using malware or the like, outputting contents of a memory into a dump file, and copying the plaintext placed in the memory.

Therefore, in the present embodiment, reading signals from the pixels of the array sensor 2 are encrypted so that a plaintext image signal is not stored in the memory.

Specifically, in the present example, amplitude control according to a coefficient corresponding the encryption key shown in FIG. 2 for reading signals from the pixels of the array sensor 2 is executed by the amplitude control circuit 10 shown in FIG. 1, thereby realizing encryption of the reading signals.

Figure 3:
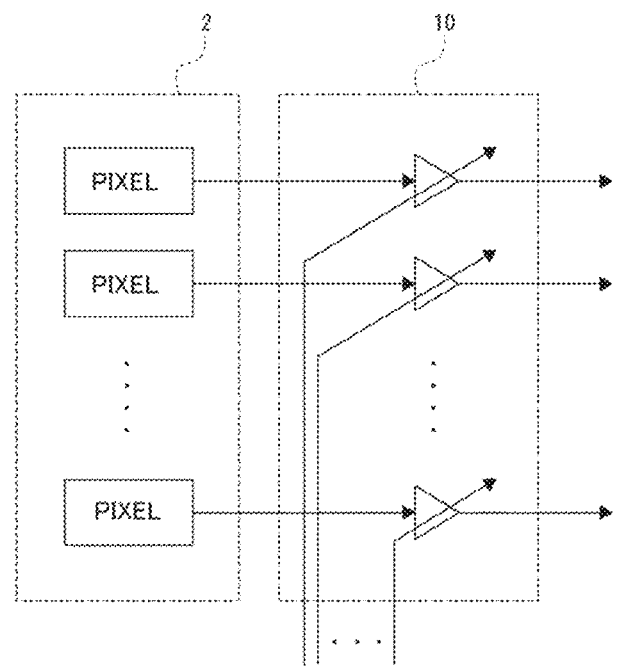
FIG. 3 is a diagram showing an image of encryption of a reading signal performed by an amplitude control circuit according to an embodiment.

FIG. 3 is a diagram showing an image of encryption of the reading signals performed by the amplitude control circuit 10.

As shown in the figure, the reading signal (a charge signal in this case) from each pixel in the array sensor 2 is multiplied by the coefficient corresponding to the encryption key by an amplifier provided in the amplitude control circuit 10. In the sensor device 1 shown in FIG. 1, after an amplitude of the reading signal for each pixel is controlled in an analog signal state, the signal is A/D converted by the ADC/pixel selector 3, and is stored in the memory 6 via the buffer 4 and the logic unit 5.

The encryption control unit 85 sets the coefficient corresponding to the encryption key in the above amplifier, and thus the reading signal from each pixel in the array sensor 2 is encrypted.

Also, FIG. 3 is just an image diagram, and the amplifier is not necessarily provided for each pixel in the amplitude control circuit 10. For example, in a case in which batch reading is performed as in a charged-coupled device (CCD) image sensor, the amplifier included in the amplitude control circuit 10 may be one common to each pixel. Also, in that case, the amplitude control for each pixel is performed by time division.

Here, it can be said that the reading signal of each pixel is a signal that constitutes the image signal. That is, the reading signal of each pixel belongs to the image signal in the sense that it constitutes a part of the image signal.

Although an example in which encryption is performed for the reading signal as an analog signal has been given above as an example of encryption for the reading signal, encryption can also be performed for a reading signal that is a digital signal after A/D conversion.

Figure 4:
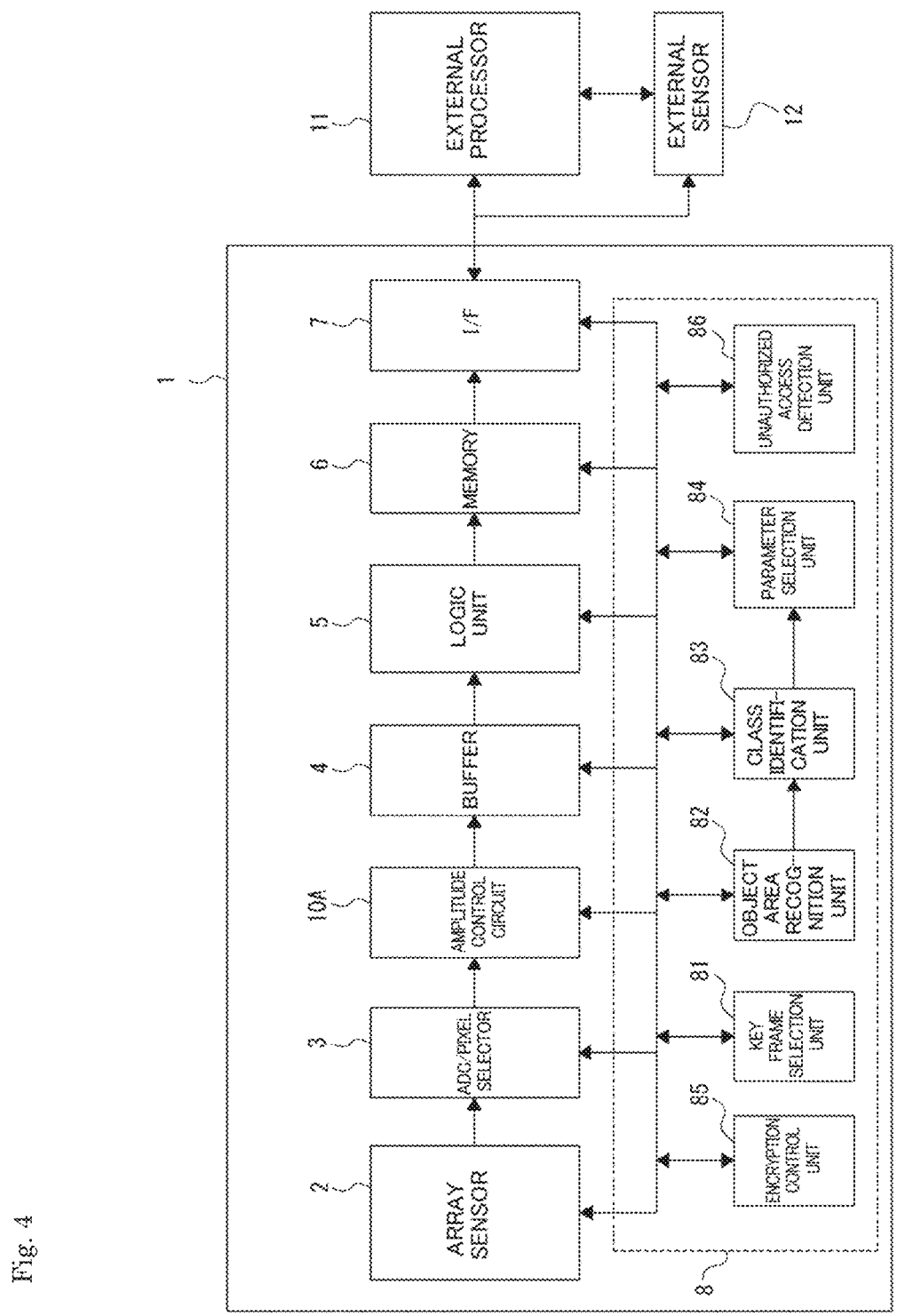
FIG. 4 is a diagram showing a configuration example of the sensor device in the case of encrypting a reading signal generated as a digital signal.

FIG. 4 shows a configuration example of the sensor device 1 in the case of encrypting the reading signal as a digital signal.

In this case, the sensor device 1 is provided with an amplitude control circuit 10A that controls an amplitude of the reading signal converted into a digital signal by the ADC/pixel selector 3 instead of the amplitude control circuit 10.

Also, since the processing performed by the encryption control unit 85 in this case is the same except that the setting target of the coefficient for each pixel corresponding to the encryption key is changed from the amplitude control circuit 10 to the amplitude control circuit 10A, repeated description thereof will be omitted.

Here, when the analog reading signal is encrypted as described above, unauthorized acquisition of the analog signal from the outside is very difficult, and thus the security can be improved.

Further, in the case in which the analog reading signal is encrypted, there is a concern that reproducibility of an image obtained by decrypting an encrypted image may decrease.

However, for example, in a case in which a target image is used to analyze attributes and behaviors of a target such as a person, the image reproducibility is considered sufficient if a target can be detected and analyzed, and there is no practical problem.

On the other hand, in a case in which a digital reading signal is encrypted, the accuracy of encryption processing can be improved, and the image reproducibility can be improved.

Here, the encryption performed on the reading signal as described above is a kind of encryption using a stream cipher method. The stream cipher method is an encryption method that encrypts plaintext in a predetermined data unit such as a bit unit or a byte unit.

In the stream cipher method, it is not necessary to make data lengths uniform for encryption target signals, and for that reason, preprocessing for encryption of a target signal is not required. Therefore, by adopting the stream cipher method, it is possible to speed up the encryption processing.

1-4. Regarding Tamper Resistance

Figure 5:
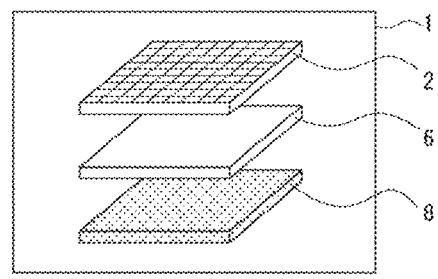
FIG. 5 is a diagram showing an example of a structure of the sensor device of an embodiment.

In the sensor device 1 of the present example, each chip of the array sensor 2, the memory 6, and the calculation unit 8 is packaged in one package as illustrated in FIG. 5 in order to improve tamper resistance in terms of hardware. In the example of FIG. 5, the chip that is the memory 6 is laminated on the chip that is the calculation unit 8, and the chip that is the array sensor 2 is further laminated on the chip that is the memory 6.

In the present example, an encryption unit that encrypts the reading signal is formed in the chips as, for example, the array sensor 2.

Further, the encryption control unit 85 that generates the encryption key based on the photoelectric random number and causes the encryption unit to execute encryption based on the encryption key is included in the chips as the calculation unit 8.

In the present example, the electrical connection between the chips is made using Cu—Cu connection in which Cu (copper) pads are connected, and when an attempt to disassemble the sensor device 1 is made, electrical connection parts of these are destroyed. That is, this makes it possible to improve tamper resistance in terms of hardware.

Figure 6:
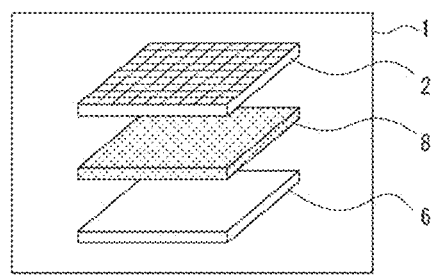
FIG. 6 is a diagram showing another example of the structure of the sensor device of an embodiment.

FIG. 6 shows another example of the structure of the sensor device 1, and the difference from FIG. 5 is that a vertical relationship between the calculation unit 8 and the memory 6 is interchanged.

Figure 7:
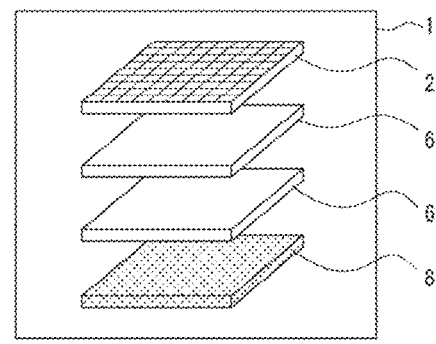
FIG. 7 is a diagram showing still another example of the structure of the sensor device of an embodiment.

FIG. 7 shows yet another example of the structure of the sensor device 1, and the difference from FIG. 5 is that a plurality of chips of the memories 6 are laminated (two layers in the example of the figure).

Further, although not shown, the sensor device 1 may have a two-layer structure in which the memory 6 is formed in the same layer as the calculation unit 8, or may also have a one-layer structure in which the array sensor 2, the memory 6, and the calculation unit 8 are formed in the same layer.

By adopting the one-package configuration as illustrated in FIGS. 5 to 7, it is possible to take measures to increase the resistance to unauthorized information acquisition from the memory 6 due to disassembly, such as the above-mentioned Cu—Cu connection, and it is possible to improve the tamper resistance in terms of hardware.

1-5. Processing Procedure

Next, a processing procedure executed by the calculation unit 8 in order to realize the encryption of the first embodiment described above will be described with reference to the flowchart of FIG. 8.

Also, at least a part of the processing described below can be realized as processing performed by hardware.

Figure 8:
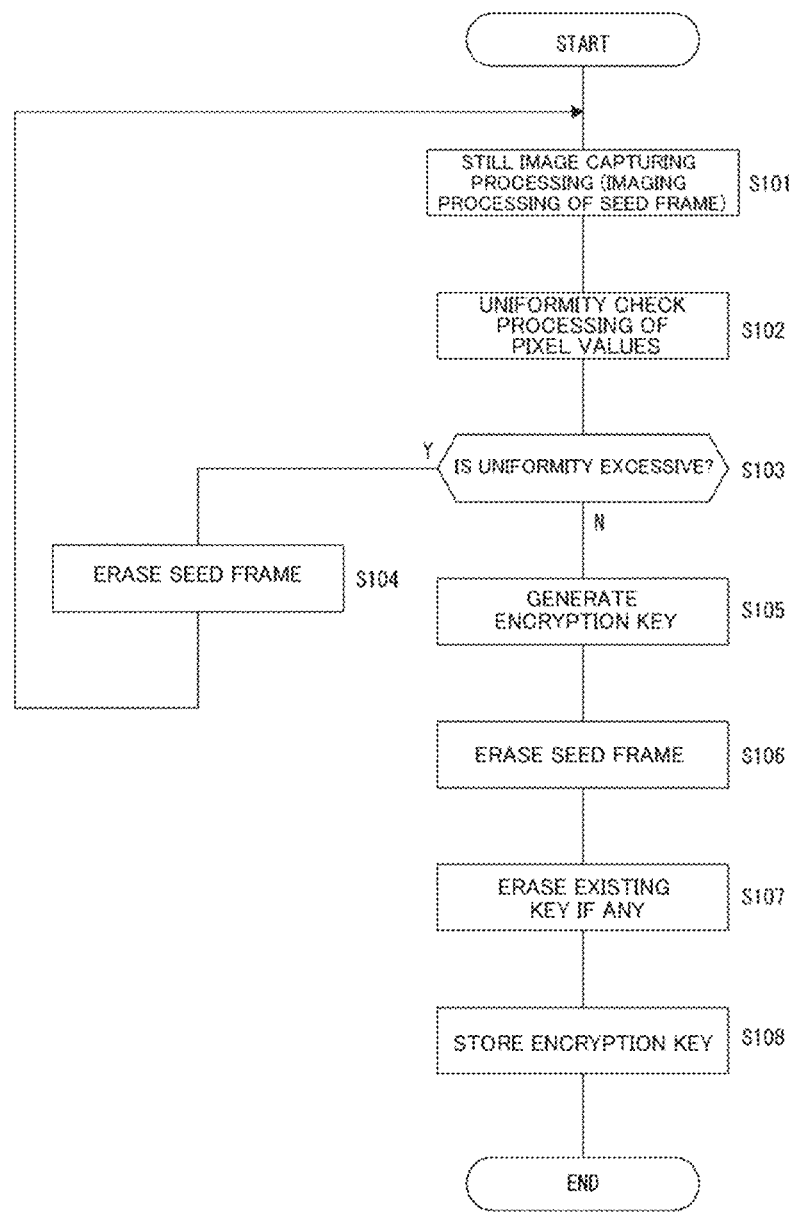
FIG. 8 is a flowchart showing a procedure of processing to be executed in order to realize encryption of a first embodiment.

First, as a premise, the calculation unit 8 of the present example starts the processing shown in FIG. 8 at the time of activation and in response to detection of unauthorized access performed by the unauthorized access detection unit 86.

By starting the processing shown in FIG. 8 in response to the detection of unauthorized access, acquisition of the photoelectric random number (S101) and generation of the encryption key (S105) are executed in response to the detection of unauthorized access. That is, the photoelectric random number is reacquired in response to the detection of unauthorized access, and the encryption key is regenerated on the basis of the reacquired photoelectric random number. Thus, it is possible to improve the tamper resistance in terms of software.

Also, the processing shown in FIG. 8 can be started on the basis of other conditions such as starting in response to an external instruction (for example, an instruction in response to an operation input) or starting at regular intervals.

In FIG. 8, the calculation unit 8 executes still image capturing processing in step S101. This still image capturing processing is processing for capturing a still image that is a source of generating the encryption key and the calculation unit 8 controls and causes the array sensor 2 to capture an image of one frame (read out charge of each pixel).

Here, the image (still image) of one frame, which is a source of generating the encryption key, is referred to as a "seed frame" below.

By executing the still image capturing processing in step S101, image data as a seed frame is stored in the memory 6.

In step S102 following step S101, the calculation unit 8 executes pixel value uniformity check processing. This uniformity check processing is processing for checking uniformity between brightness values for each pixel for the seed frame, and specifically, the calculation unit 8 counts the number of pixels whose brightness value is zero or has a saturation value (maximum value).

Also, the pixel value uniformity check processing can also be executed by performing uniformity check processing targeting values of the reading signal.

In step S103 following step S102, the calculation unit 8 determines whether or not the uniformity is excessive. Specifically, it is determined whether or not the number of pixels counted in step S102 is equal to or greater than a predetermined threshold (for example, a value corresponding to 30% to 50% of the number of effective pixels).

In a case in which the number of pixels counted in step S102 is equal to or greater than the above threshold and the determination result that the uniformity is excessive is obtained, the calculation unit 8 proceeds to step S104 to execute processing of erasing the seed frame, that is, processing of erasing the image data as the seed frame stored in the memory 6, and then returns to step S101.

Thus, the seed frame can be re-imaged in response to the case in which the randomness of pixel values of the seed frame is low. That is, the photoelectric random number can be reacquired in response to the case in which the randomness of photoelectric random numbers is low.

Therefore, it is possible to prevent the encryption from being performed by an encryption key based on random numbers having low randomness, and the security can be improved.

On the other hand, in step S103, in a case in which the determination result that the number of counted pixels is not equal to or more than the above threshold and the uniformity is not excessive is obtained, the calculation unit 8 proceeds to step S105 to generate the encryption key. Specifically in the present example, on the basis of the brightness values of each pixel in the seed frame, the encryption key representing coefficients to be set for each amplifier in the amplitude control circuit 10 (or 10A) is generated.

Here, in the processing of step S105 in the present example, an encryption key in a format in which the brightness values for each pixel are directly assigned to pixel positions from which the brightness values are obtained is not generated, but an encryption key in a format in which at least some brightness values for each pixel are assigned to pixel positions different from the pixel positions from which the brightness values are obtained is generated.

This makes it difficult to decrypt the encryption key and the security can be improved.

In step S106 following step S105, the calculation unit 8 executes processing of erasing the seed frame, that is, processing of erasing the image data as the seed frame stored in the memory 6 through the image capturing processing of step S101.

By performing this seed frame erasing processing, it is possible to prevent the image, which is the source of the photoelectric random numbers, from leaking out and the photoelectric random numbers from being estimated.

For example, in a case in which processing capacity of the calculation unit 8 is large, an image size of the seed frame is small, or the like, it is not necessary to temporarily store the seed frame in the memory 6. In that case, the calculation unit 8 (encryption control unit 85) receives the photoelectric random numbers from, for example, the amplitude control circuit 10 (or 10A) and generates the encryption key in step S105 via the processing of steps S102 and S103. In this case, the erasing processing of step S106 is unnecessary (of course, the erasing processing of step S104 is also unnecessary).

In the following step S107, the calculation unit 8 erases an existing key, if any. For example, in a case in which the processing shown in FIG. 8 is started at regular intervals, the encryption key is stored in the memory 6 through the processing of step S108 performed in the past. The processing of step S107 is processing of erasing the existing encryption key in such a case in which the existing encryption key is stored in the memory 6.

By performing such erasing processing of the existing key, it is possible to prevent the leakage of the encryption key used for encryption in the past, and prevention of unauthorized decryption of the signal encrypted in the past can be achieved.

In the following step S108, the calculation unit 8 executes encryption key storage processing. That is, processing of storing the encryption key generated in step S105 in the memory 6 is executed.

The calculation unit 8 completes a series of processing shown in FIG. 8 in response to the execution of the storage processing in step S108.

In the sensor device 1, the encryption key stored in step S108 is used to encrypt the image signal obtained by imaging with the array sensor 2. Specifically, after the processing shown in FIG. 8 is completed, the calculation unit 8 (encryption control unit 85) sets the coefficients for each pixel based on the stored encryption key in each amplifier in the amplitude control circuit 10 (or 10A) and causes the encryption based on the stored encryption key to be performed on the image signal obtained by the imaging with the array sensor 2.

In the present example, the array sensor 2 is supposed to capture a moving image, and the encryption performed by the amplitude control circuit 10 (or 10A) is performed on each frame image constituting the moving image.

Here, as understood from the above description, in the present example, the encryption of the image signal is performed on the basis of the photoelectric random numbers obtained in a frame period different from that of the encryption target image signal.

This increases the difficulty of estimating the encryption key from the encrypted image, and the security can be improved.

Further, it is also possible to encrypt the image signal on the basis of the photoelectric random numbers obtained in the same frame period as the encryption target image signal.

1-6. Output Information of Sensor Device

Here, the calculation unit 8 can perform analysis of attributes and actions of a target object, specifically, in the present example, an object of a target class among the above-mentioned classes.

For example, in a case in which the image obtained by imaging with the array sensor 2 is a surveillance image in a store, by using image analysis, it is possible to analyze attributes such as the number, genders, ages, heights, weights of customers (persons) as targets whether or not they wear glasses, and whether or not they wear hats, or it is possible to analyze actions of customers such as changes in the customers' movement trajectories (lines of flow) and postures in the store.

Alternatively, in a case in which the image obtained by imaging with the array sensor 2 is a monitoring image of a vehicle passing on a road, it is possible to analyze attributes such as types and colors of vehicles as targets, the number of passengers, genders of the passengers, or the like, or it is possible to analyze actions such as lines of flow, speeds, or the like on the road.

Figure 9:
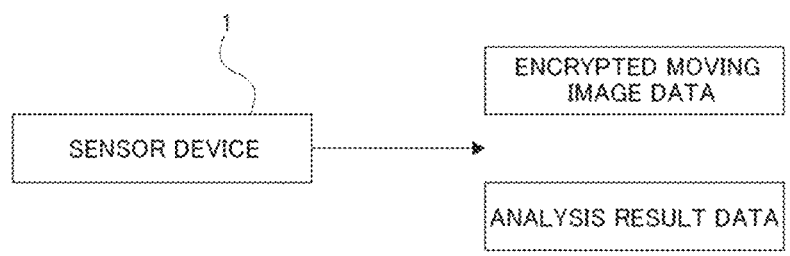
FIG. 9 is an explanatory diagram of output of analysis result data in the first embodiment.

As shown in FIG. 9, the sensor device 1 can also adopt a configuration in which data representing the results of the above analysis ("analysis result data" in the figure) is output to the external processor 11 together with moving image data on which the encryption according to the above-described embodiment has been performed ("encrypted moving image data" in the figure).

In this case, the interface unit 7 can output the analysis result data as metadata of the encrypted moving image data. Alternatively, it can be output separately from the encrypted moving image data.

Further, with respect to the analysis result data, it is also conceivable that, for example, the external processor 11 side instructs the interface unit 7 of necessary information, and the interface unit 7 outputs the corresponding information.

Here, in the encryption method of the present example, since the encryption is performed at the time of the reading signal, it is necessary to decrypt the encrypted image signal in order for the calculation unit 8 to perform the object detection and the above analysis. In the present example, the calculation unit 8 performs these object detection and analysis processing while decrypting the encrypted image data stored in the memory 6 using an on-the-fly method. The on-the-fly method is a method of processing encrypted data while decrypting it in byte units or word units.

This makes it possible to reduce the possibility that the image signal in the plaintext state is leaked when the object detection from the image or the analysis of the detected object is performed, and the security can be improved.

1-7. Regarding Key Transfer

Figure 10:
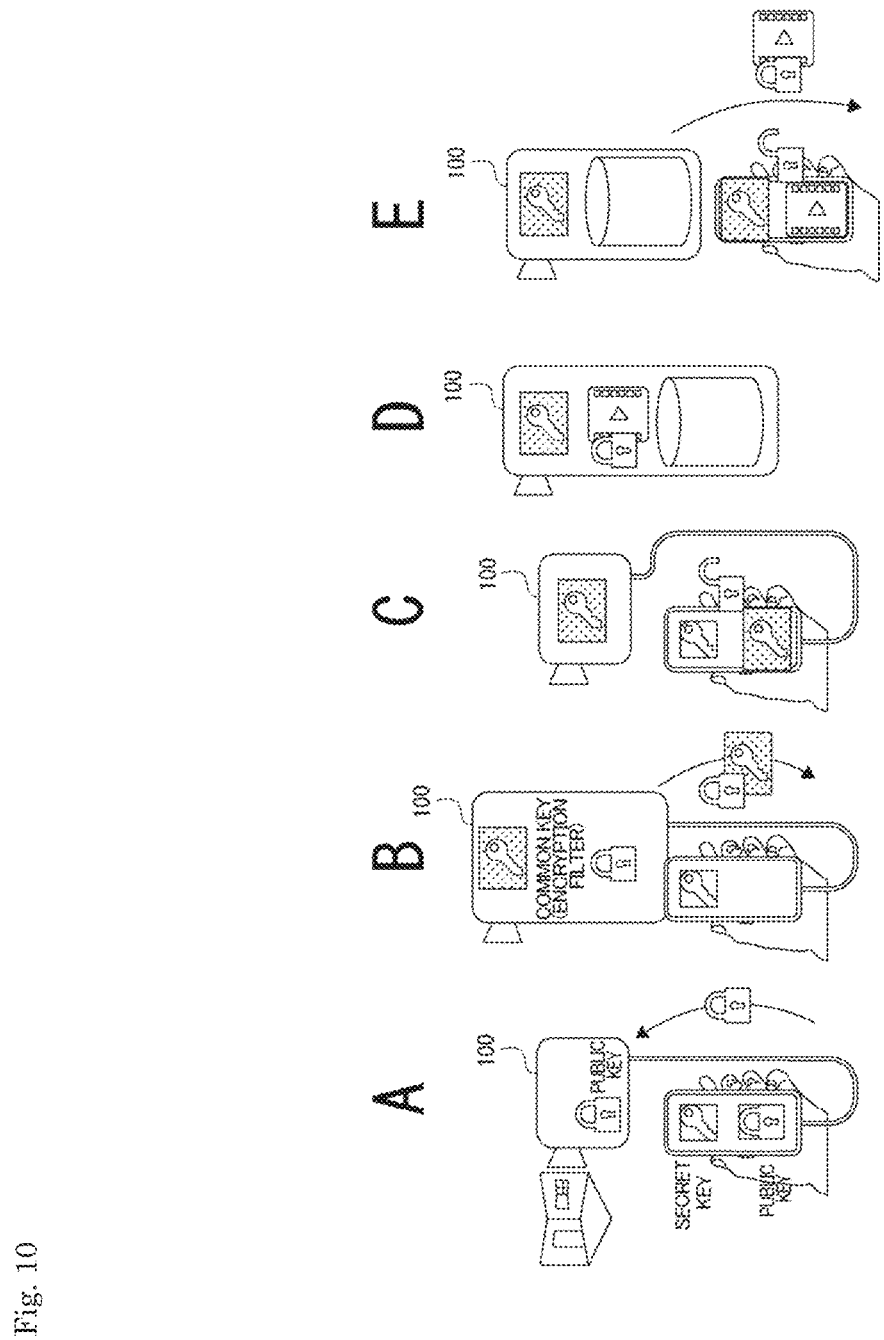
FIG. 10 is a diagram for explaining an example of a method for securely transferring a key for decryption to a receiving side of an image.

With reference to FIG. 10, an example of a method of securely transferring a key for decryption to the receiving side of the image will be described. The method is a method of transferring a common key using public key cryptography. First, the receiving side of the image creates a public key and a private key, and transfers the public key to a camera device 100 having the sensor device 1 (FIG. 10A).

On the camera device 100 side that has acquired the public key the encryption key generated on the basis of the photoelectric random numbers is used as the common key as described above, and the common key is encrypted by the public key and transmitted to the receiving side of the image (FIG. 10B).

Then, on the receiving side of the image, the transmitted common key (decryption key) is decrypted using the private key created in FIG. 10A (FIG. 10C).

Thus, the receiving side of the image can decrypt the encrypted moving image data received from the camera device 100 at high speed by using the decrypted common key later. FIG. 10D schematically shows that image encryption is performed on the camera device 100 side using a common key and FIG. 10E schematically shows that the image data encrypted by the common key is decrypted by the receiving side of the image using the common key.

Also, although it takes about several seconds to encrypt the common key with the public key shown in FIG. 10B and to decrypt the common key with the private key shown in FIG. 10C, these encryptions and decryptions are required only once for each key transfer.

2. SECOND EMBODIMENT

2-1. Encryption Method of Second Embodiment

Next, the encryption method as a second embodiment will be described.

Also, in the following description, parts that are similar to the parts that have already been explained will be denoted by the same reference numerals, and the description thereof will be omitted. In the second embodiment, the configuration of the sensor device 1 is also the same as that shown in FIG. 1, and therefore repeated description thereof will be omitted.

In the second embodiment, encryption is performed for the target area of the image signal.

Specifically in the second embodiment, the entire image and the target area are encrypted on the basis of different encryption keys, and the target area is encrypted on the basis of different encryption keys in an area of a specific part and other area, whereby the concealment level of information is changed stepwise depending on decryption keys held on the receiving side of the image.

Figure 12:
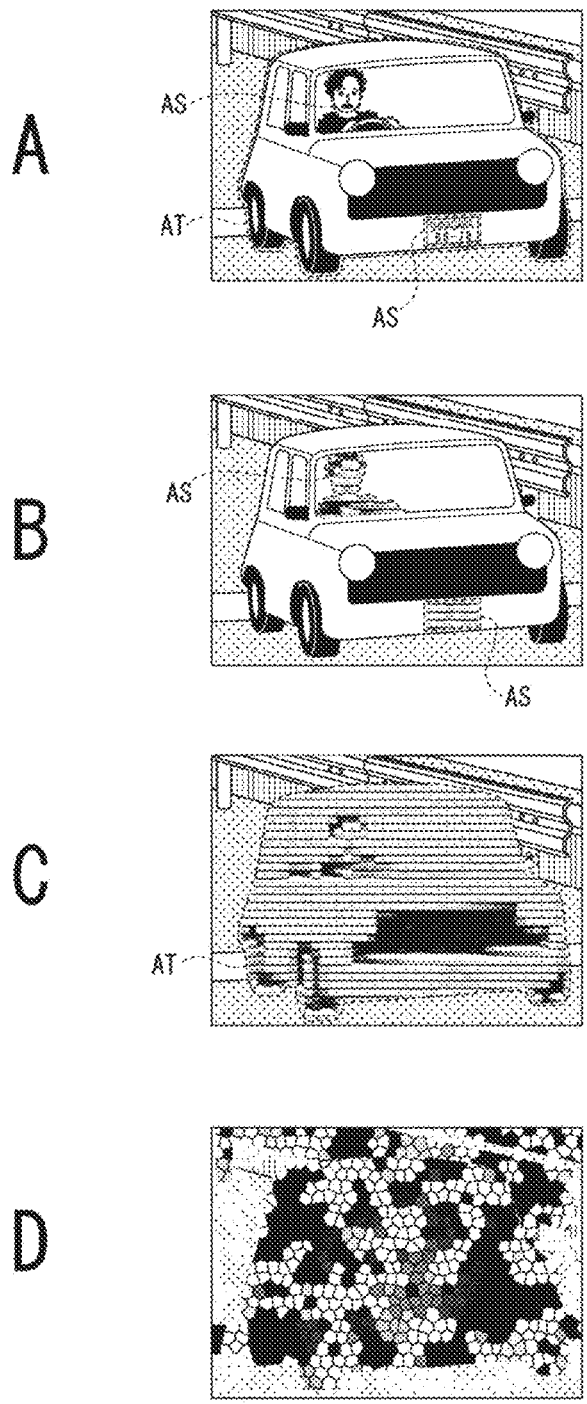
FIG. 12 is a diagram showing an image of stepwise encryption in a case in which the class of the target is a vehicle.

FIGS. 11 and 12 are diagrams for explaining an image of stepwise encryption in the second embodiment.

FIG. 11 shows an image of stepwise encryption when the target class is a person.

FIG. 11A shows an image before encryption. In this case, the target area AT is the entire area in which the person is projected in the image. Further, in this case, the specific area AS, which is the area of the specific part, is an area of a face of the person.

FIG. 11B shows an image in which only the specific area AS is encrypted, FIG. 11C shows an image in which only the target area AT including the specific area AS is encrypted, and FIG. 11D shows an image in which the entire image is encrypted.

FIG. 12 shows an image of stepwise encryption in a case in which the target class is a vehicle, and FIG. 12A shows an image before encryption.

In this case, the target area AT is the entire area in which the vehicle is projected in the image, and the specific area AS includes areas of a vehicle passenger and a license plate.

FIG. 12B is an image in which only the specific area AS is encrypted, FIG. 12C is an image in which only the target area AT including the specific area AS is encrypted, and FIG. 12D is an image in which the entire image is encrypted.

Here, the image before encryption shown in FIG. 12A is personal information that can be individually identified because both the passenger and the license plate are shown. For that reason, it is not suitable for use in marketing data.

When the image is encrypted only in the specific area AS shown in FIG. 12B, it is possible to determine types and the number of vehicles, for example, for marketing purposes of a vehicle manufacturer without obtaining individually identifiable information such as passengers including a driver and the license plate. When only the target area AT shown in FIG. 12C is encrypted in the image, it is possible to acquire only the information on the number and movements of vehicles without acquiring personal information or vehicle type information. For example, a congestion situation can be determined.

In the case of the examples of FIGS. 11 and 12, at least three types of a first encryption key that supports encryption of the entire image, a second encryption key that supports encryption of the target area AT only and a third encryption key that supports encryption of only the specific area AS are generated as the encryption keys.

Figure 13:
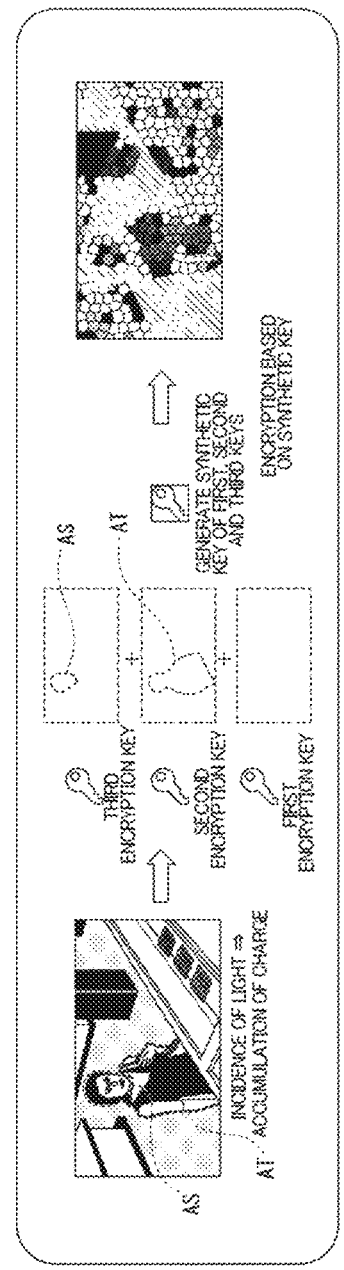
FIG. 13 is a diagram for explaining an example of a specific method of stepwise encryption.

FIG. 13 is a diagram for explaining an example of a specific method of stepwise encryption.

In the present example, encryptions based on the first, second, and third encryption keys are not individually performed on the target image, but encryption on the target image is performed on the basis of a synthetic key obtained by synthesizing these plurality of encryption keys.

First, the third encryption key for encrypting the specific area AT, the second encryption key for encrypting the entire target area AT, and the first encryption key for encrypting the entire image are prepared. Three types of photoelectric random numbers may be obtained (that is, three types of seed frames are imaged) in generating these three types of encryption keys, but in the present example, in order to shorten the time required to generate the encryption keys, three types of encryption keys are generated from common photoelectric random numbers. Specifically in the present example, in generating the three types of encryption keys, first, three types of random numbers (hereinafter referred to as a first random number, a second random number, and a third random number, respectively) in which the arrangement of the numerical values for each pixel in the common photoelectric random numbers is different are generated.

Then, the third encryption key is generated as an encryption key obtained by extracting a numerical value of each pixel of the specific area AS from a numerical value of the third random number.

Also, the second encryption key is generated as an encryption key obtained by extracting a numerical value of each pixel of the target area AT from a numerical value of the second random number.

The first encryption key is generated as an encryption key to which the first random number is applied as it is.

Then, as the synthetic key, an encryption key obtained by synthesizing these first, second, and third encryption keys is generated as shown in the figure.

Then, on the basis of the synthetic key, the target image is encrypted.

By performing the above-mentioned stepwise encryption, it is possible to change the concealment level of information depending on the decryption keys held by the receiving side of the image.

Figure 14:
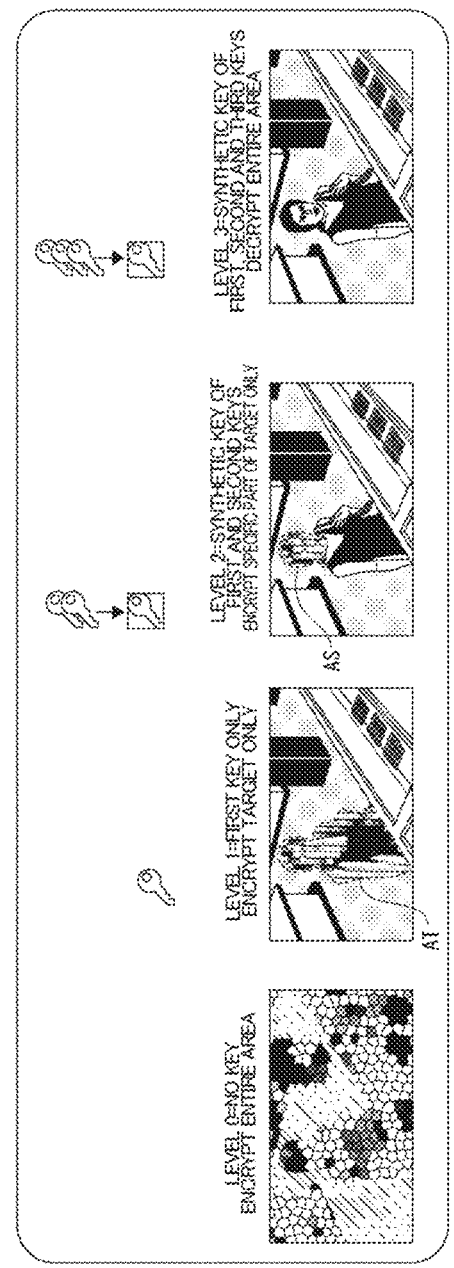
FIG. 14 is an explanatory diagram of an example of a change in concealment level.

FIG. 14 is an explanatory diagram of an example of a change in the concealment level.

Here, 4 levels from level 0 to level 3 are defined as the level related to key holding. As shown, level 0 indicates no key, level 1 indicates holding of only the first encryption key, level 2 indicates holding of a synthetic key of the first and second encryption keys, and level 3 indicates holding of a synthetic key of the first, second, and third encryption keys.

In the case of level 0, the encrypted image cannot be decrypted on the receiving side of the image, and an image in which the entire area is encrypted can be obtained.

In the case of level 1, the receiving side of the image can decrypt areas other than the target area AT by using the first encryption key and thus an image in which only the target area AT is encrypted can be obtained.

In the case of level 2, the receiving side of the image can decrypt areas other than the specific area AS by using the synthetic key of the first and second encryption keys, and thus an image in which only the specific area AS in the target is encrypted can be obtained.

In the case of level 3, the receiving side of the image can decrypt the entire image using the synthetic key of the first, second, and third encryption keys, and in this case, an image in which the information is not concealed can be obtained.

Here, in the present example, since the encryption target image is a moving image, the object as the target projected in the image may be displaced in the image with the lapse of time. For this reason, in the case of performing encryption for the target area AT as described above, it is necessary to track the target.

Hereinafter, an example of a specific method of encryption as a second embodiment including tracking such a target will be described with reference to FIG. 15.

Figure 15:
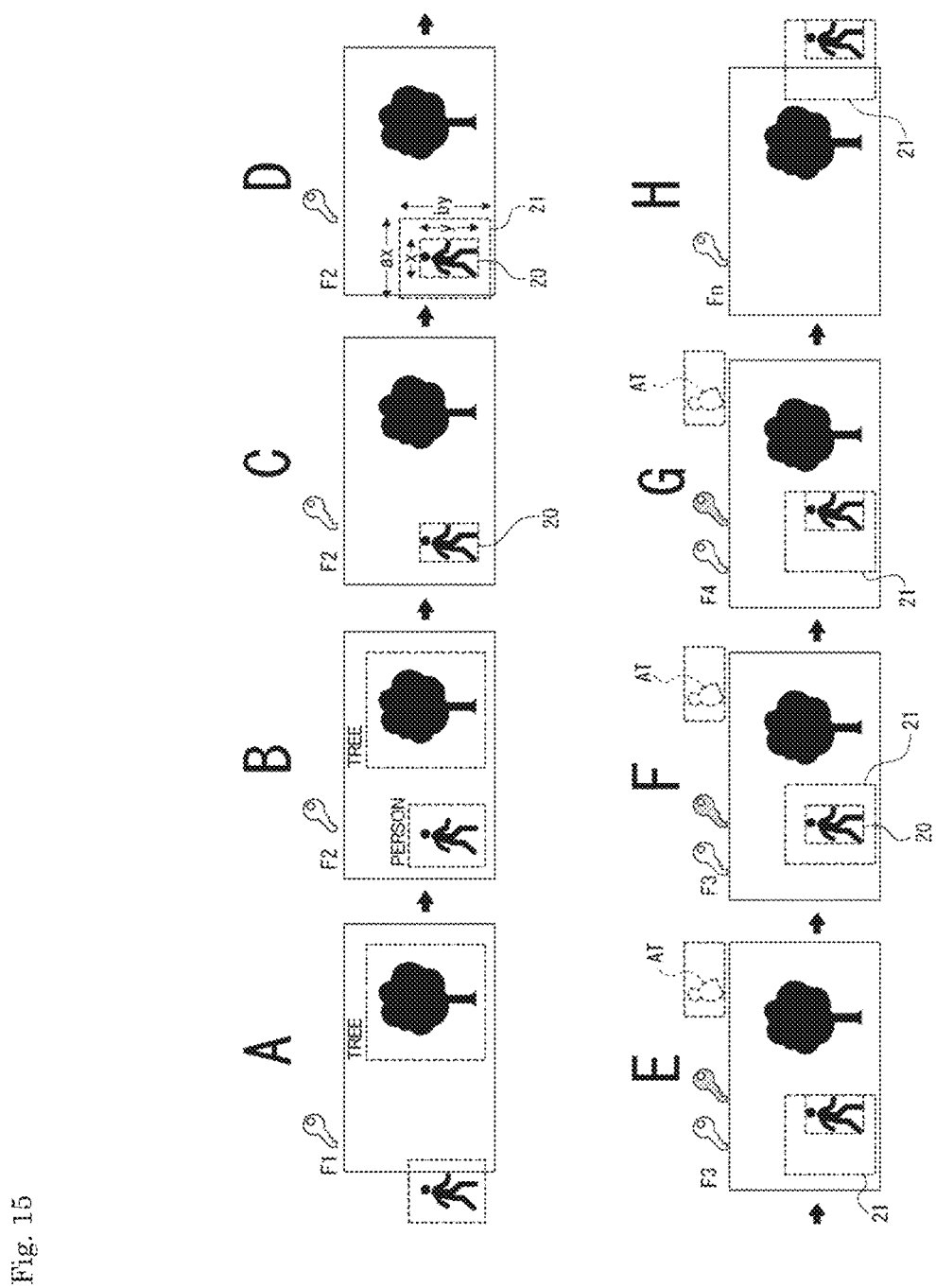
FIG. 15 is a diagram for explaining an example of a specific method of encryption of a second embodiment.

Also, in FIG. 15, the target class is assumed to be a "person". Further, in FIG. 15, for convenience of explanation, an example is given in which the specific area AC and other areas are not distinguished in the target area AT, and only the target area AT and other areas in the image are encrypted separately.

First, a frame F1 shown in FIG. 15A shows a state in which a person in the target class has not yet in the frame. Here, it is taken as an example in which an object of a "tree" that is not the target class is identified in the image.

Here, encryption for the entire image is performed regardless of the presence or absence of a target. That is, in the present example, the image of each frame F is encrypted by the amplitude control circuit 10 (or 10A) on the basis of the first encryption key corresponding to the entire image, and then stored in the memory 6. White key marks shown in each sub-figure of FIG. 15 indicate that the encryption has performed on the entire image as an output image.

For tracking the target, the calculation unit 8 performs detection or class identification of the area of the object in the image (processing of the object area recognition unit 82 and the class identification unit 83 described above). In order to perform these processing, the calculation unit 8 decrypts the frame image encrypted and stored as described above. That is, the calculation unit 8 executes the processing for target tracking while decrypting the frame image encrypted on the basis of the first encryption key.

The calculation unit 8 performs the decryption at this time using an on-the-fly method. As a result, it is possible to reduce the possibility that the plaintext image signal is leaked when tracking of the target is performed, and the security can be improved.

A frame F2 shown in FIG. 15B shows a state in which the target class of "person" is in the frame. In this state, the target class "person" is identified along with the already identified "tree".

In a case in which the object of the target class is identified in this way, the calculation unit 8 (object area recognition unit 82) performs calculation of a bounding box 20 with accurate position coordinates surrounding the area of the object.

For example, FIG. 15C shows an example of the bounding box 20 for an image of a person who is the target class. That is, the bounding box 20 is calculated as a more accurate area of the object corresponding to the target class.

Further, the calculation unit 8 (object area recognition unit 82) calculates an ROI 21 which is a region of interest on the basis of the bounding box 20.

FIG. 15D shows the ROI 21 and the bounding box 20. The ROI 21 is calculated by for example, enlarging (a×x×b×y) vertical and horizontal sizes (x×y) of the bounding box 20. Although the enlargement scales a and b can be set separately for vertical and horizontal directions and an enlargement ratio thereof may be fixed, it is also conceivable that the sensor device 1 is designated from the outside (for example, the external processor 11 or the like).

In the present example, with this ROI 21 set as the target area AT, the encryption is performed using an encryption key different from the entire image.

Here, the frame F2 is a frame in which the target class is newly identified in the image and can be called a target class discovery frame in other words.

In the present example, since the method of encrypting the reading signal from the pixel is adopted, the encryption based on the second encryption key cannot be performed on the ROI 21 in the target class discovery frame. The encryption based only on the first encryption key has already been performed on the target class discovery frame to store it in the memory 6. In this way, if the target class discovery frame on which the encryption based only on the first encryption key has been performed is output as it is, the image area of the ROI 21 will be disclosed to a holder of only the first encryption key without being concealed.

Therefore, in the present example, the target class discovery frame is erased from the memory 6, so that an appropriate information concealment level according to the decryption keys held by the receiving side of the image is realized.

FIG. 15E represents a frame F3, which is a frame next to the frame F2.

From the frame F next to the target class discovery frame, the encryption based on the second encryption key targeting the ROI 21 is performed. The ROI 21 here is the ROI 21 calculated at the time of the frame F2 which is the target class discovery frame.

In a case in which a "person" as the target class is moving, the person in the frame F3 further moves in a moving direction side from the frame F2, but by setting the ROI 21 to have a larger range than the bounding box 20, the person as the target class can be accommodated in the ROI 21 in the frame F3. That is, the person as the target class falls within a target range of the encryption based on the second encryption key.

Similarly after the frame F3, the bounding box 20 and the ROI 21 for the target class are also calculated, and thus the target class is tracked (see FIG. 15F).

In addition, after the frame F4, as in the frame F3, the ROI 21 calculated in the previous frame F is subject to the encryption based on the second encryption key (see FIG. 15G).

FIG. 15H shows a frame Fn after the "person" as the target class is out of frame.

The ROI 21 is no longer calculated because the target class is out of frame. For this reason, the encrypted based only on the first encryption key is performed on the image of the frame Fn.

In the above description, an example in which a rectangular area obtained by enlarging the bounding box 20 is set to the ROI 21 has been described, but the ROI 21 is not limited to the rectangular area.

The ROI 21 may be calculated from the area of the object of the target class using, for example, semantic segmentation, that is, object area detection at the pixel level.

Figure 16:
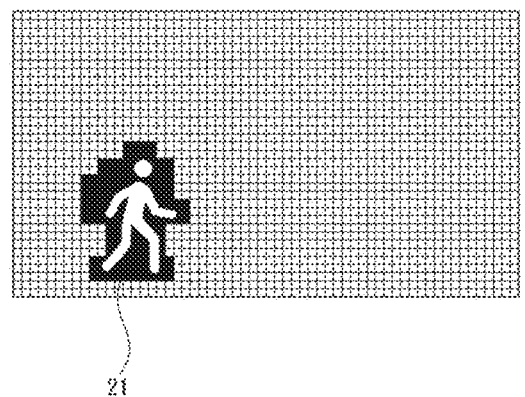
FIG. 16 is a diagram for explaining a modified example of an ROI in the second embodiment.

FIG. 16 shows the ROI 21 based on the semantic segmentation. This is an example in which a non-rectangular ROI 21 is set by expanding a pixel area as an object (for example, a person).

The rectangular ROI 21 may not include a part or may be too large in the case of, for example, a truck with protrusions, a person riding a bicycle, or the like.

When the non-rectangular ROI 21 is generated in accordance with a position of the object position at the pixel level, a concealed area related to the target can be appropriately set without excess or deficiency.

2-2. Processing Procedure

The procedure of the processing executed by the calculation unit 8 in order to realize the encryption as the second embodiment described above will be described with reference to flowcharts of FIGS. 17 and 18.

Figure 17:
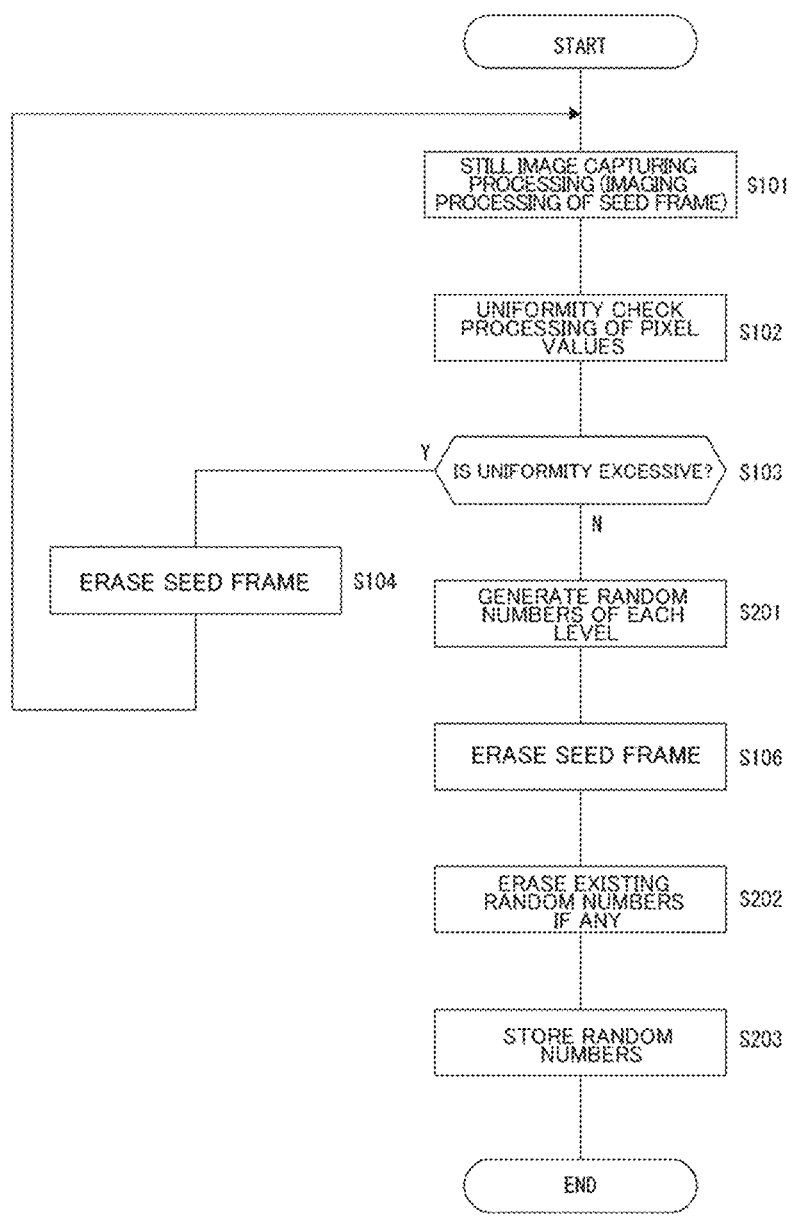
FIG. 17 is a flowchart showing processing corresponding to a process from imaging of a seed frame to storage of a random number that is a source of an encryption key in the second embodiment.

FIG. 17 shows processing corresponding to a process from imaging the seed frame to storing the random numbers that are the source of the encryption key. Also, in FIG. 17, the same step numbers are assigned to the same processing as those already described in FIG. 8, and the description thereof will be omitted.

Similar to the processing of FIG. 8, processing of FIG. 17 is started at the time of activation and in response to detection of unauthorized access performed by the unauthorized access detection unit 86. Alternatively, the processing can be started on the basis of other conditions such as starting at regular time intervals. Also, at least a part of the processing described with reference to FIGS. 17 and 18 can be realized as processing using hardware.

In FIG. 17, in a case in which the calculation unit 8 in this case determines that the uniformity is excessive in step S103, the calculation unit 8 proceeds to step S201 to generate random numbers at each level. Here, since the specific area AS is not distinguished in the target area AT, two types of random numbers, the first random number and the second random number described above, are generated.

Further, since the method of generating various random numbers on the basis of the photoelectric random numbers of the seed frame has already been described, repeated descriptions thereof will be omitted.

In this case, the calculation unit 8 executes the seed frame erasing processing in step S106 in response to executing the random number generation processing in step S201.

Then, in response to executing the erasing processing in step S106, the calculation unit 8 executes processing of erasing any existing random numbers in step S202. That is, it is processing of erasing random numbers when there are the random numbers (first random number and second random number) of each level stored in the memory 6 in the processing of step S203 executed in the past.

In step S203 following step S202, the calculation unit 8 performs processing of storing the random numbers of each level generated in step S201 in the memory 6 and ends a series of processing shown in FIG. 17.

Figure 18:
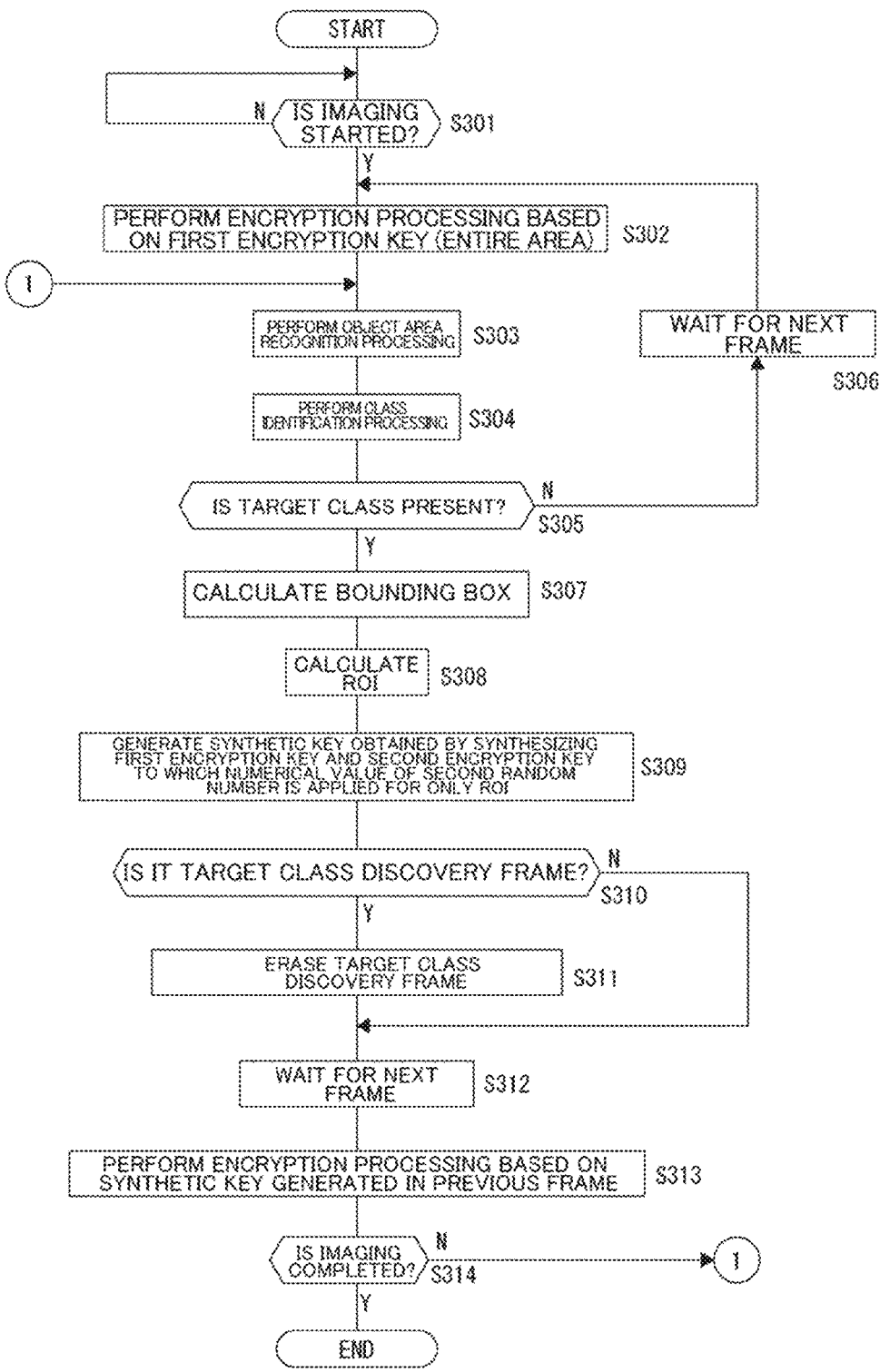
FIG. 18 is a flowchart showing processing for encrypting a target image basis of the encryption key generated in the second embodiment.

FIG. 18 shows processing for encrypting the target image on the basis of the generated encryption key.

First, the calculation unit 8 waits for the start of imaging of the encryption target image in step S301, and executes the encryption processing using the first encryption key in step S302 when the imaging starts. That is, the amplitude control circuit 10 (or 10A) is instructed of the coefficients for each pixel based on the first encryption key and caused to execute the encryption of the reading signal of the array sensor 2. As can be understood from the above description, in the present example, the first encryption key is an encryption key to which the first random number is applied as it is.

In step S303 following step S302, the calculation unit 8 executes the object area recognition processing and executes the class identification processing in the subsequent step S304. The object area recognition processing in step S303 is processing of the object area recognition unit 82 described above, and processing of detection of candidate objects and recognition of object areas thereof from the image of the current frame is performed. Further, the class identification processing in step S304 is processing of the class identification unit 83 described above, and class identification is performed on the object detected in the object area recognition processing described above. In a case in which a plurality of objects or a plurality of types of objects are detected, the class identification is performed for each, and they are classified into each class. For example, in the case of FIG. 15B above, the class identification and the classification are performed, for example, such that there are one object of the class "tree" and one object of the class "person".

Further, the calculation unit 8 executes the processing of steps S303 and S304 while decrypting the frame image encrypted in step S302 and step S313, which will be described later, using an on-the-fly method.

In step S305 following step S304, the calculation unit 8 determines whether or not there is the target class. That is, it is determined whether or not there is the target class among the classes identified in step S304.

If there is no target class, the calculation unit 8 waits for the next frame in step S306 (waits for arrival of the next frame period) and then returns to step S302.

That is, until the target class is detected, the encryption processing for the entire image in step S302, the object area recognition processing in step S303, and the class identification processing in step S304 are repeatedly executed frame by frame.

In a case in which it is determined in step S305 that there is the target class, the calculation unit 8 proceeds to step S307 to calculate the bounding box 20 and then calculates the ROI 21 in step S308.

Further, in the following step S309, the calculation unit 8 generates the synthetic key in which the second encryption key, to which the numerical value of the second random number is applied only to the ROI 21, and the first encryption key are combined.

In response to the generation of the synthetic key in step S309, the calculation unit 8 determines in step S310 whether or not it is the target class discovery frame. If the current frame is the target class discovery frame, the calculation unit 8 executes processing of erasing the target class discovery frame in step S311. As a result, it is possible to prevent target image portions of the target class discovery frame from not being concealed even though the key holding level is level 1.

In step S310, if the current frame is not the target class discovery frame, the calculation unit 8 skips the erasing processing of step S311 and performs processing of waiting for the next frame in step S312. Further, when the erasing processing of step S311 is executed, the calculation unit 8 also performs processing of waiting for the next frame in step S312.

In response to executing the waiting processing in step S312, the calculation unit 8 executes the encryption processing using the synthetic key generated in the previous frame in step S313. That is, the amplitude control circuit 10 (or 10A) is instructed of the coefficients for each pixel based on the synthetic key to execute the encryption of the reading signal of the array sensor 2.

In step S314 following step S313, the calculation unit 8 determines whether or not the imaging is completed, that is, whether or not the imaging of the encryption target image should be terminated, for example, when an external imaging end instruction is given, or the like.

If the imaging is not completed, the calculation unit 8 returns to step S303. Thus, the processing described so far is repeated until the imaging is completed. That is, if the target class is continuously present, calculation of the ROI for the target class, generation of a synthetic key based on the calculated ROI, and encryption processing based on the synthetic key generated in the previous frame are performed, and if the target class is no longer present, the encryption processing using the synthetic key is not performed, and the encryption processing using the first encryption key is executed.

When the imaging is completed, the calculation unit 8 ends a series of processing shown in FIG. 18.

Also, in the present example, the ROI 21 is set as an expanded area of the bounding box 20 to be able to include the object as the target in the next frame, but it is also conceivable that the enlargement scales a and b when the vertical and horizontal sizes (x×y) are enlarged (a×x×b×y) correspond to a frame rate.

For example, if the frame rate is low, a frame interval time becomes longer and an amount of movement of an object such as a person increases, and thus it is conceivable to widen the ROI 21 as compared with the case in which the frame rate is high.

Further, in a case in which the encryption is performed on the target area AT by distinguishing a specific part from other areas, the bounding box 20 and the ROI 21 are calculated for the specific part using the same method as the method described above, and the third encryption key is generated by applying the numerical value of the third random number to the calculated ROI 21. Then, a synthetic key obtained by synthesizing the first, second, and third encryption keys may be generated and used for encrypting the image of the next frame.

2-3. Output Example of Analysis Information

Further, in the second embodiment, the sensor device 1 can also be configured to output the analysis result data together with the encrypted moving image data (see FIG. 9).

Figure 19:
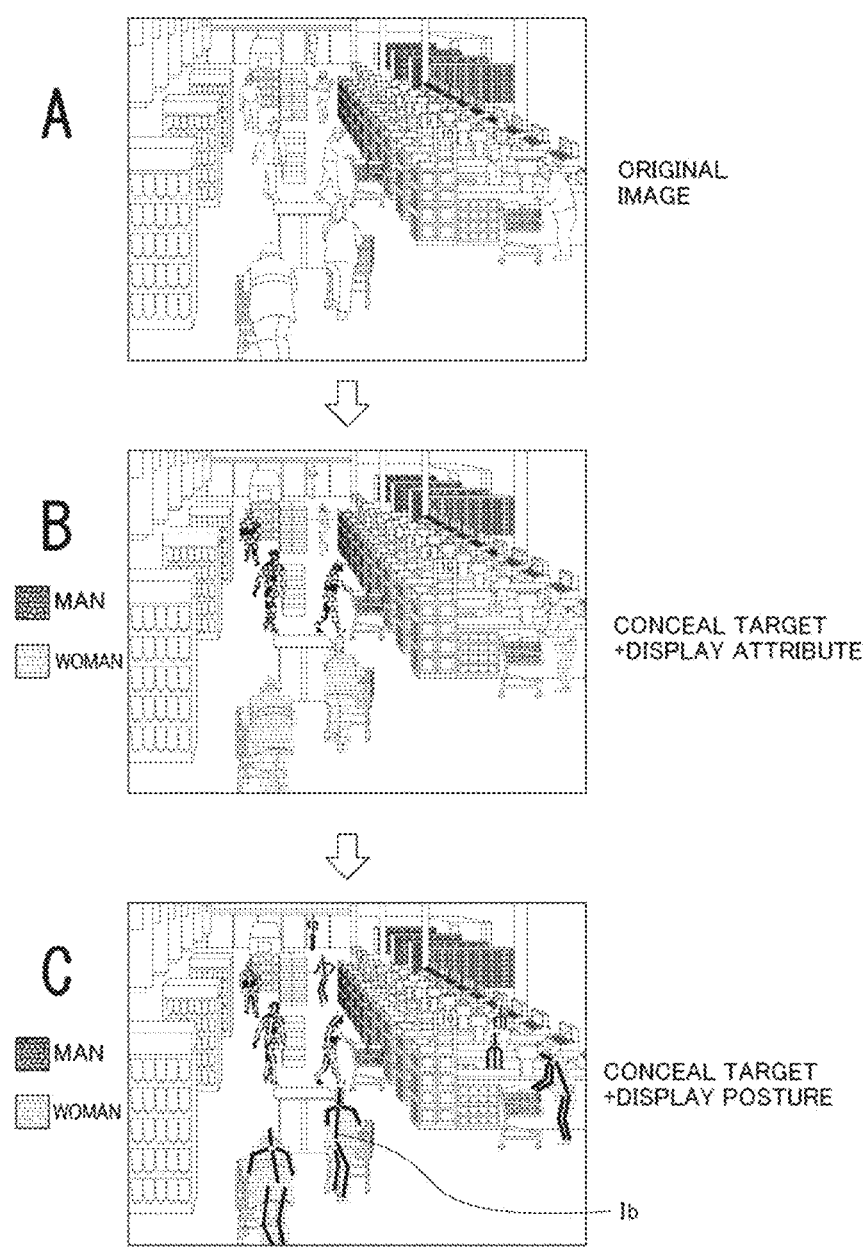
FIG. 19 is an explanatory diagram of output of analysis result data in the second embodiment.

At this time, in the second embodiment, since the encryption targeting the target area AT is performed, the analysis result data is not limited to textual data and may be data that can be displayed as an image, for example, as illustrated in FIG. 19.

In FIG. 19, FIG. 19A represents an original image before encryption.

FIG. 19B is a diagram in which gender information of the target is distinguishably displayed by a color attached to the encrypted target area as an example of displaying attribute information analyzed for the target (here, a "person") on the image.

Further, FIG. 19C is an example in which posture information Ib obtained by the analysis processing of the target is superimposed and displayed on the target area in the encrypted state.

By performing the encryption targeting the area of the target in this way, it is possible to provide an image that makes it easier to understand the analysis results of the attributes and behaviors of the target while ensuring the confidentiality of personal information.

In recent years, there have been an increasing number of cases in which in-store camera images are used as marketing data. In that case, it is not necessary to identify an individual customer, and information such as attribute analysis and behavior analysis of the customer is required. The image in FIG. 19A is individually identifiable data and is highly confidential information, and thus a system with high security measures is required, resulting in high cost. The image shown in FIG. 19B is useful as marketing data because lines of flow of the customer in the store and attributes of men and women can be seen. Since a posture of the customer can be further recognized in the image shown in FIG. 19C, it becomes possible to determine a behavior of the customer who picks up a product or tries it on but did not purchase it, so that it can be used as high-value marketing data.

Since an individual cannot be identified in both the image of FIG. 19B and the image of FIG. 19C, there is an advantage of being operable in a low-cost security measure system as compared with the image of FIG. 19A. Further, the camera equipped with the sensor device 1 as the embodiment is used, and thus even if malware is installed on an in-store camera, there is no plaintext data, and an effect of no risk of being hacked is provided.

3. MODIFIED EXAMPLES

Further, the embodiment is not limited to the specific examples described so far, and various modified examples can be considered.

For example, although not specifically mentioned above, the present technique can also be appropriately applied to a case in which an array sensor 2 having a color filter based on, for example, a Bayer array, is used and a color image is obtained as a captured image.

In a case in which the array sensor 2 having a color filter is used, for example, a predetermined plurality of pixels consisting of a vertical line×a horizontal line=a plurality of pixels×a plurality of pixels are regarded as one color unit, and pixel values are combined for each color unit to obtain a color signal value such as an RGB value. For example, if a Bayer array is adopted, a vertical line×horizontal line=2× 2=4 pixels on which a color filter by RGGB is formed are regarded as one color unit, and each pixel value (brightness value) of RGGB is combined for each color unit to obtain a set of RGB values.

In a case in which the array sensor 2 having a color filter is used, an encryption key to which a random value is assigned for each color unit can also be generated as an encryption key for image encryption.

FIG. 20 is an explanatory diagram of an example of generating the encryption key to which a random value is assigned for each color unit.

In the example of FIG. 20A, the brightness value of one pixel in the color unit is assigned as the random value of each pixel in the unit. Specifically, in the example of the figure, a brightness value of an upper left pixel is assigned as the random value of each pixel in the unit for each color unit.

In the example of FIG. 20B, a value calculated through a predetermined calculation using brightness values of pixels in the unit is assigned as the random value of each pixel for each color unit. As a specific example, it is conceivable to assign an average value of the brightness values of each pixel in the unit as the random value of each pixel in the unit for each color unit. That is, in terms of the color unit located at the upper left corner in the figure, Vmix1=(V1+V2+V7+V8)/4.

In this case, the calculation using brightness values of all the pixels in the unit is not necessarily performed, and it is also possible to perform the calculation using only brightness values of some pixels. For example, it is set to be Vmix1=(V1+V7)/2, or the like. Also, the averaged value is not necessarily used for each unit. For example, it is conceivable to assign a total value of the brightness values of each pixel to each unit such as Vmix1=V1+V2+V7+V8.

By generating the encryption key to which the random value is assigned for each color unit as described above, a processing load can be reduced as compared with the case in which random values are assigned for each pixel.

Further, in the above, an example in which the encryption target signal is the image signal in the encryption using the photoelectric random numbers has been described, but the encryption target signal is not limited to the image signal.

Also, in the above, an example in which the photoelectric random numbers are used for encryption in the method of encrypting the reading signals from the pixels of the array sensor 2 and the method of encrypting the target area has been described, the random numbers used for encryption in these methods are not limited to the photoelectric random numbers. For example, pseudo-random numbers can be used. Alternatively in a case in which true random numbers are used, for example, a method of detecting a natural phenomenon such as a change in heat or sound, which is practically impossible to predict or reproduce, with a corresponding sensor and generating random numbers on the basis of the values can be mentioned.

4. SUMMARY OF EMBODIMENTS

As described above, the encryption device (sensor device 1) of the embodiment includes, as described in the first embodiment, the encryption key generation unit (encryption control unit 85) that generates the encryption key on the basis of the photoelectric random numbers that are random numbers obtained on the basis of photoelectric conversion performed by the array sensor (array sensor 2) in which the plurality of pixels each having the light receiving element of visible or invisible light are arranged one-dimensionally or two-dimensionally, and the encryption unit (amplitude control circuit 10 or 10A) that encrypts the target signal on the basis of the encryption key generated by the encryption key generation unit.

Thus, it is possible to realize the encryption in which it is more difficult to decrypt the encryption key than in a case of using pseudo-random numbers.

Therefore, the security can be improved.

Also, in the encryption device of the embodiment, the encryption key generation unit acquires the values of the electric signals for each pixel obtained by the photoelectric conversion as the photoelectric random numbers to generate the encryption key.

Thus, it is possible to generate the encryption key that is difficult to be decrypted.

Therefore, the security can be improved.

Further, in the encryption device of the embodiment, the encryption unit performs the encryption based on the encryption key on the image signal obtained by imaging with the array sensor.

Thus, it is possible to perform the encryption on the image signal with the encryption key to which the coefficients for encryption are assigned to each pixel of the array sensor.

Therefore, there is no need to perform complicated calculation processing for encrypting the image signal, and the encryption processing speed can be increased.

Furthermore, in the encryption device of the embodiment, the encryption key generation unit generates the encryption key in a format in which at least some values of electric signals for each pixel are assigned to pixel positions different from pixel positions from which values of the electric signals are obtained.

Thus, it is difficult to decrypt the encryption key as compared with the case of using an encryption key in which the values of the electric signals for each pixel are directly assigned to the pixel positions from which the values of the electric signals are obtained.

Therefore, the security can be improved.

Also, in the encryption device of the embodiment, the encryption key generation unit generates the encryption key on the basis of the photoelectric random numbers obtained in a frame period different from a frame period of the image signal to be encrypted by the encryption unit.

Thus, the difficulty of estimating the encryption key from the encrypted image is increased.

Therefore, the security can be improved.

Further, in the encryption device of the embodiment, the encryption key generation unit reacquires the photoelectric random numbers in a case in which the uniformity of the electric signal values has been recognized in at least some of the pixels.

Thus, it is possible to prevent the encryption from being performed by an encryption key based on random numbers with low randomness.

Therefore, the security can be improved.

Furthermore, in the encryption device of the embodiment, the encryption key generation unit, the encryption unit, and the array sensor are configured in one package.

Thus, it is possible to improve the tamper resistance in terms of hardware.

Therefore, the security can be improved.

Also, in the encryption device of the embodiment, the encryption key generation unit reacquires the photoelectric random numbers in response to the detection of unauthorized access from the outside of the encryption device.

Thus, after the unauthorized access from the outside is detected, it is possible to perform the encryption based on the re-acquired photoelectric random numbers.

Therefore, the security can be improved.

Further, in the encryption device of the embodiment, the encryption key generation unit erases the previously generated encryption key from the memory in response to the reacquisition of the photoelectric random numbers.

Thus, it is possible to prevent leakage of the encryption key used for the encryption in the past.

Therefore, it is possible to prevent unauthorized decryption of signals encrypted in the past, and the security can be improved.

Furthermore, in the encryption device of the embodiment, the encryption key generation unit erases the image signal that is the source of the photoelectric random numbers from the memory in response to the generation of the encryption key.

Thus, it is possible to prevent the image that is the source of the photoelectric random numbers from leaking out and the photoelectric random numbers from being estimated.

Therefore, the security can be improved.

Also, in the encryption device of the embodiment, the encryption unit encrypts the target signal using a stream cipher method.

Thus, preprocessing for the encryption of the target signal is not required.

Therefore, it is possible to speed up the encryption processing.

Also, the encryption method of the embodiment is an encryption method including: generating the encryption key on the basis of the photoelectric random numbers, which are random numbers obtained on the basis of the photoelectric conversion performed by the array sensor in which a plurality of pixels each having the light receiving element of visible or invisible light are arranged one-dimensionally or two-dimensionally; and performing the encryption of the target signal on the basis of the generated encryption key.

With such an encryption method, the same operations and effects as those of the encryption device of the above-mentioned embodiment can also be obtained.

Further, the sensor device of the embodiment (sensor device 1) includes, as described in the first embodiment, the array sensor (array sensor 2) in which the plurality of pixels each having the light receiving element of visible or invisible light are arranged one-dimensionally or two-dimensionally and the encryption unit (the amplitude control circuit 10 or 10A, or the encryption control unit 85) that encrypts the reading signals from the pixels of the array sensor.

By performing the encryption of the reading signal in this way it is possible to prevent the plaintext image signal from being stored in the memory.

Therefore, the security can be improved.

Also, in the sensor device of the embodiment, the encryption unit has the first amplitude control unit (amplitude control circuit 10) that performs amplitude control of the reading signal as the analog signal and performs the encryption of the reading signal by executing the amplitude control in accordance with the encryption key in the first amplitude control unit.

It is very difficult to acquire the reading signal as analog signal from the outside of the sensor device.

Therefore, the security can be improved.

Further, in the sensor device of the embodiment, the encryption unit has the second amplitude control unit (amplitude control circuit 10A) that performs amplitude control of the reading signal converted into a digital signal by the A/D converter and performs the encryption on the reading signal by executing the amplitude control in accordance with the encryption key in the second amplitude control unit.

Thus, the encryption is performed as the amplitude control for the digital signal, and the accuracy of encryption processing is improved as compared with a case in which the amplitude control for the analog signal is performed.

Therefore, it is possible to improve the reproducibility of the image content when the encrypted image is decrypted.

Furthermore, in the sensor device of the embodiment, the array sensor and the encryption unit are configured in one package.

Thus, it is possible to improve the tamper resistance in terms of hardware.

Therefore, the security can be improved.

Also, in the sensor device of the embodiment, the encryption unit generates the encryption key on the basis of the photoelectric random numbers which are random numbers obtained on the basis of the photoelectric conversion performed by the array sensor and performs the encryption on the reading signal on the basis of the generated encryption key.

Thus, it is possible to realize the encryption in which it is more difficult to decrypt the encryption key than in a case of using pseudo-random numbers.

Therefore, the security can be improved.

Further, in the sensor device of the embodiment, the encryption unit generates the encryption key on the basis of the photoelectric random numbers obtained in a frame period different from the frame period of the encryption target reading signal.

Thus, the difficulty of estimating the encryption key from the encrypted image is increased.

Therefore, the security can be improved.

Furthermore, in the sensor device of the embodiment, the encryption unit reacquires the photoelectric random numbers in response to the detection of unauthorized access from the outside of the sensor device.

Thus, after the unauthorized access from the outside is detected, it is possible to perform the encryption on the basis of the re-acquired photoelectric random numbers.

Therefore, the security can be improved.

Also, in the sensor device of the embodiment, the encryption unit erases the encryption key generated in the past from the memory in response to the reacquisition of the photoelectric random number.

Thus, it is possible to prevent leakage of the photoelectric random numbers used for the encryption in the past.

Therefore, it is possible to prevent unauthorized decryption of signals encrypted in the past, and the security can be improved.

Further, in the sensor device of the embodiment, the encryption unit erases the image signal that is the source of the photoelectric random numbers from the memory in response to the generation of the encryption key.

Thus, it is possible to prevent the image that is the source of the photoelectric random numbers from leaking out and the photoelectric random numbers from being estimated.

Therefore, the security can be improved.

Further, another encryption method of the embodiment is an encryption method of performing the encryption on the reading signals from the pixels of the array sensor in which the plurality of pixels each having the light receiving element of visible or invisible light are arranged one-dimensionally or two-dimensionally.

With such an encryption method, the same operations and effects as those of the sensor device of the above-mentioned embodiment can also be obtained.

Further, another sensor device of the embodiment (sensor device 1) includes, as described in the second embodiment, the array sensor (array sensor 2) in which the plurality of pixels each having the light receiving element of visible or invisible light are arranged one-dimensionally or two-dimensionally, the detection unit (calculation unit 8: particularly the object area recognition unit 82, or the class identification unit 83) that detects the area of the target projected in the image as the target area on the basis of the image signal obtained by imaging with the array sensor, and the encryption unit (the amplitude control circuit 10 or 10A, or the encryption control unit 85) that performs the encryption targeting the target area in the image signal on the basis of the information of the target area detected by the detection unit.

Thus, it is possible to perform the encryption on the image signal obtained by imaging with the array sensor in the image sensor at least to the extent that no individual can be identified.

Therefore, it is not necessary to take measures against the leakage of personal information on the receiving side of the image, and the cost can be reduced. In addition, depending on the state of holding of the decryption key on the receiving side of the image, a part of the content of the image can be visually recognized while personal information is concealed. That is, it is possible to realize the image encryption in which excessive concealment of information is prevented.

For example, it is possible to prevent excessive information concealment, which makes it difficult to even grasp a shooting location, such as which store the image was shot at, and both concealment of personal information and prevention of excessive damage to usefulness of the image can be achieved.

Also, in the sensor device of the embodiment, as the encryption of the image signal, the encryption unit encrypts the entire image on the basis of the first encryption key and encrypts the target area on the basis of the first encryption key and the second encryption key different from the first encryption key.

Thus, the part of the image that can be decrypted is distinguished in accordance with the type of the decryption key held by the receiving side of the image.

Specifically, in the case in which only the decryption key corresponding to the first encryption key is held, only the area other than the target area in the image can be decrypted, and in the case in which the decryption keys corresponding to the first encryption key and the second encryption key are held, the entire image including the target area can be decrypted.

Therefore, it is possible to realize a useful encryption method in which the concealment level of information can be changed stepwise depending on the decryption keys held on the receiving side of the image.

Further, in the sensor device of the embodiment, the detection unit performs processing of recognizing a specific part of the target and performs the encryption on the basis of different encryption keys in the area of the specific part and other areas in the target area.

Thus, it is possible to change the concealment level of the target depending on the decryption keys held by the receiving side of the image. For example, in a case in which the target is a person, it is possible to classify the concealment level such as concealment of the whole body and concealment of only a face thereof.

Therefore, it is possible to provide an encrypted image with an appropriate concealment level according to a usage mode of the image.

Furthermore, the sensor device of the embodiment includes the analysis unit (calculation unit 8) that analyzes attributes or actions of the target, and the output unit (interface unit 7) that outputs information representing the results of analysis performed by the analysis unit.

Thus, even if the receiving side of the image does not have the decryption key, the analysis result about the attributes and actions of the target can be provided.

Also, in the sensor device of the embodiment, the detection unit detects the target by decrypting the image signal encrypted on the basis of the first encryption key using an on-the-fly method.

Thus, it is possible to reduce the possibility that the image signal in the plaintext state is leaked.

Therefore, the security can be improved.

Further, in the sensor device of the embodiment, the encryption unit performs the encryption on the image signal on the basis of a synthetic key obtained by synthesizing a plurality of encryption keys.

Thus, in realizing the encryption that changes the concealment level of personal information stepwise, the number of executions of the required encryption processing can be reduced.

Therefore, it is possible to reduce the processing load related to the encryption.

Furthermore, in the sensor device of the embodiment, the encryption unit performs the encryption targeting the target area while tracking the target.

Thus, in a case in which the encryption target image is a moving image, it is possible to appropriately conceal a moving target.

Also, in the sensor device of the embodiment, the encryption unit performs the encryption of the image signal using a stream cypher method.

Thus, preprocessing for the encryption of the image signals is not required.

Therefore, it is possible to speed up the encryption processing.

Further, in the sensor device of the embodiment, the array sensor, the detection unit, and the encryption unit are configured in one package.

Thus, it is possible to improve the tamper resistance in terms of hardware.

Therefore, the security can be improved.

Furthermore, in the sensor device of the embodiment, the encryption unit generates the encryption key on the basis of the photoelectric random numbers which are random numbers obtained on the basis of the photoelectric conversion performed by the array sensor and performs the encryption on the image signal on the basis of the generated encryption key.

Thus, it is possible to realize the encryption in which it is more difficult to decrypt the encryption key than in a case of using pseudo-random numbers.

Therefore, the security can be improved.

Also, in the sensor device of the embodiment, the encryption unit performs the encryption on reading signals from the pixels of the array sensor.

Thus, it is possible to prevent the plaintext image signal from being stored in the memory in the encryption.

Therefore, the security can be improved.

Also, yet another encryption method of the embodiment is an encryption method including: detecting the area of the target, projected in the image as the target area on the basis of the image signal obtained by imaging with the array sensor in which the plurality of pixels each having the light receiving element of visible or invisible light are arranged one-dimensionally or two-dimensionally; and performing the encryption targeting the target area in the image signal on the basis of information of the detected target area.

With such an encryption method, the same operations and effects as those of the sensor device of the above-mentioned embodiment can also be obtained.

Also, the effects described in the present specification are merely examples and are not intended as limiting, and other effects may be obtained.

5. PRESENT TECHNIQUE

The present technique may also have configurations as below.

(1)

A sensor device including:
an array sensor in which a plurality of pixels each having a light receiving element of visible or invisible light are arranged one-dimensionally or two-dimensionally;
a detection unit that detects an area of a target projected in an image as a target area on the basis of an image signal obtained by imaging with the array sensor; and
an encryption unit that performs encryption targeting the target area in the image signal on the basis of information of the target area detected by the detection unit.

(2)

The sensor device according to the above (1), wherein in the encryption of the image signal, the encryption unit encrypts the entire image on the basis of a first encryption key and encrypts the target area on the basis of the first encryption key and a second encryption key different from the first encryption key.

(3)

The sensor device according to the above (2),
wherein the detection unit performs processing of recognizing a specific part of the target, and
the encryption unit performs the encryption on the basis of different encryption keys for an area of the specific part and other areas in the target area.

(4)

The sensor device according to any of the above (1) to (3), further including:
an analysis unit that analyzes attributes or actions of the target, and
an output unit that outputs information representing analysis results performed by the analysis unit.

(5)

The sensor device according to any of the above (2) to (4), wherein the detection unit performs detection of the target by decrypting the image signal encrypted on the basis of the first encryption key using an on-the-fly method.

(6)

The sensor device according to any of the above (2) to (5), wherein the encryption unit encrypts the image signal on the basis of a synthetic key obtained by synthesizing a plurality of encryption keys.

(7)

The sensor device according to any of the above (1) to (6), wherein the encryption unit performs encryption targeting the target area while tracking the target.

(8)

The sensor device according to any of the above (1) to (7), wherein the encryption unit performs encryption of the image signal using a stream cipher method.

(9)

The sensor device according to any of the above (1) to (8), wherein the array sensor, the detection unit, and the encryption unit are configured in one package.

(10)

The sensor device according to any of the above (1) to (9), wherein the encryption unit generates an encryption key on the basis of a photoelectric random number which is a random number obtained on the basis of photoelectric conversion performed by the array sensor and performs encryption of the image signal on the basis of the generated encryption key.

(11)

The sensor device according to any of the above (1) to (10), wherein the encryption unit performs encryption of reading signals from the pixels of the array sensor.

REFERENCE SIGNS LIST

1 Sensor device
2 Array sensor
3 ADC/pixel selector
4 Buffer
5 Logic unit
6 Memory
7 Interface unit
8 Calculation unit
10, 10A Amplitude control circuit
20 Bounding box
21 ROI
82 Object area recognition unit
83 Class identification unit
85 Encryption control unit
86 Unauthorized access detection unit
100 Camera device

The invention claimed is:

1. A sensor device comprising:
an array sensor in which a plurality of pixels each having a light receiving element of visible or invisible light are arranged one-dimensionally or two-dimensionally; and
an electronic processor configured to detect whether a target area is projected in an image on a basis of an image signal obtained by imaging with the array sensor,
responsive to detecting that the target area is not projected in the image, perform a full encryption of an entirety of the image on a basis of only a first encryption key,
responsive to detecting that the target area is projected in the image, perform a multi-sectional encryption of the image, the multi-sectional encryption including a first encryption section corresponding to the target area of the image and a second encryption section corresponding to a remaining portion of the image that is distinct from the target area, the first encryption section is encrypted on a basis of a synthetic key, the synthetic key created from a synthesized combination of two or more encryption keys, the two or more encryption keys including the first encryption key and a second encryption key different from the first encryption key, and the second encryption section is encrypted on the basis of only the first encryption key,
wherein the multi-sectional encryption further includes a third encryption section entirely within the first encryption section, and
wherein the third encryption section is encrypted on the basis of the synthetic key from the combination of the two or more encryption keys, the two or more encryption keys including the first encryption key, the second encryption key, and a third encryption key different from the second encryption key.

2. The sensor device according to claim 1, wherein the electronic processor is further configured to analyze attributes or actions of a target in the target area, and
wherein the electronic processor is further configured to output information representing analysis results of the attributes or the actions of the target.

3. The sensor device according to claim 1, wherein the electronic processor is further configured to perform detection of the target area by decrypting the image signal encrypted on the basis of the first encryption key using an on-the-fly method.

4. The sensor device according to claim 1, wherein the electronic processor is further configured to encrypt the first encryption section while tracking a target in the target area.

5. The sensor device according to claim 1, wherein the electronic processor is further configured to perform the full encryption or the multi-sectional encryption using a stream cipher method.

6. The sensor device according to claim 1, wherein the array sensor and the electronic processor are disposed in one package.

7. The sensor device according to claim 1, wherein the electronic processor is configured to perform the full encryption or the multi-sectional encryption on signals read directly from the plurality of pixels of the array sensor.

8. A sensor device comprising:
an array sensor in which a plurality of pixels each having a light receiving element of visible or invisible light are arranged one-dimensionally or two-dimensionally; and
an electronic processor configured to
detect whether a target area is projected in an image on a basis of an image signal obtained by imaging with the array sensor,
responsive to detecting that the target area is not projected in the image, perform a full encryption of an entirety of the image on a basis of only a first encryption key,
responsive to detecting that the target area is projected in the image, perform a first encryption of the target area of the image on a basis of the first encryption key and a second encryption key different from the first encryption key, and
responsive to detecting that the target area is projected in the image, perform a second encryption of a remaining portion of the image on the basis of only the first encryption key,
wherein the remaining portion of the image is separate and distinct from the target area of the image,
wherein the second encryption is separate and distinct from the first encryption, and wherein the electronic processor is further configured to
generate the first encryption key on a basis of a first photoelectric random number which is a first random number obtained on the basis of photoelectric conversion performed by the array sensor, and
generate the second encryption key on a basis of a second photoelectric random number which is a second random number obtained on the basis of the photoelectric conversion performed by the array sensor, generate a third encryption key on a basis of a third photoelectric random number which is a third random number obtained on the basis of the photoelectric conversion performed by the array sensor, and perform additional encryption of the image on a basis of the third encryption key.

9. An encryption method performed by a sensor device comprising:

detecting, with an electronic processor of the sensor device, whether a target area is projected in an image on a basis of an image signal obtained by imaging with an array sensor of the sensor device in which a plurality of pixels each having a light receiving element of visible or invisible light are arranged one-dimensionally or two-dimensionally;

responsive to detecting that the target area is projected in the image, performing, with the electronic processor, a multi-sectional encryption of the image, the multi-sectional encryption including a first encryption section corresponding to the target area of the image and a second encryption section corresponding to a remaining portion of the image that is distinct from the target area, the first encryption section is encrypted on a basis of a synthetic key, the synthetic key created from a synthesized combination of two or more encryption keys, the two or more encryption keys including a first encryption key and a second encryption key different from the first encryption key, and the second encryption section is encrypted on the basis of only the first encryption key, wherein the multi-sectional encryption further includes a third encryption section entirely within the first encryption section, and wherein the third encryption section is encrypted on the basis of the synthetic key from the combination of the two or more encryption keys, the two or more encryption keys including the first encryption key, the second encryption key, and a third encryption key different from the second encryption key.

10. The encryption method according to claim 9, further comprising:

performing, with the electronic processor, detection of the target area by decrypting the image signal encrypted on the basis of the first encryption key using an on-the-fly method.

11. The encryption method according to claim 9, further comprising:

analyzing, with the electronic processor, attributes or actions of a target in the target area, and outputting, with the electronic processor, information representing analysis results of the attributes or the actions of the target.

12. The encryption method according to claim 9, further comprising:

tracking a target in the target area, wherein, while tracking the target, performing, with the electronic processor, the multi-sectional encryption of the image on the basis of information of the target area that is detected.

13. The encryption method according to claim 9, further comprising:

performing, with the electronic processor and a stream cipher method, the multi-sectional encryption of the image.

14. The encryption method according to claim 9, wherein the array sensor and the electronic processor are disposed in one package.

15. The encryption method according to claim 9, further comprising:

generating, with the electronic processor, the first encryption key on a basis of a photoelectric random number which is a random number obtained on the basis of photoelectric conversion performed by the array sensor.

16. The encryption method according to claim 9, further comprising:

wherein the multi-sectional encryption is performed on signals read directly from the plurality of pixels of the array sensor.

* * * * *